US012803475B2

(12) United States Patent
Abbott et al.

(10) Patent No.: US 12,803,475 B2
(45) Date of Patent: Nov. 17, 2026

(54) POWER TOOL IMPLEMENTING A DYNAMIC TRIGGER RESPONSE TO CONTROL THE POWER TOOL

(71) Applicant: MILWAUKEE ELECTRIC TOOL CORPORATION, Brookfield, WI (US)

(72) Inventors: Jonathan E. Abbott, Wilmington, DE (US); Devlin N. Thyne, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 209 days.

(21) Appl. No.: 18/620,626

(22) Filed: Mar. 28, 2024

(65) Prior Publication Data

US 2024/0333179 A1 Oct. 3, 2024

Related U.S. Application Data

(60) Provisional application No. 63/493,482, filed on Mar. 31, 2023.

(51) Int. Cl.
*H02K 7/102* (2006.01)
*B25B 21/00* (2006.01)
*G05B 13/04* (2006.01)
*H02P 6/08* (2016.01)

(52) U.S. Cl.
CPC .............. *H02P 6/085* (2013.01); *B25B 21/00* (2013.01); *G05B 13/042* (2013.01)

(58) Field of Classification Search
CPC .............................. H02P 6/085; G05B 13/042
See application file for complete search history.

(56) References Cited

U.S. PATENT DOCUMENTS

| | | | |
|---|---|---|---|
| 6,260,427 | B1 | 7/2001 | Jones et al. |
| 10,491,148 | B2 | 11/2019 | Ichikawa et al. |
| 11,221,611 | B2 | 1/2022 | Abbott et al. |
| 11,366,457 | B1 | 6/2022 | George et al. |
| 2003/0037423 | A1 | 2/2003 | Siegel |
| 2005/0167130 | A1 | 8/2005 | Setter et al. |
| 2006/0289183 | A1 | 12/2006 | Schreiber |

(Continued)

FOREIGN PATENT DOCUMENTS

| | | | |
|---|---|---|---|
| CN | 118393861 | A | 7/2024 |
| CN | 118393862 | A | 7/2024 |

(Continued)

*Primary Examiner* — Muhammad S Islam
(74) *Attorney, Agent, or Firm* — Quarles & Brady LLP

(57) ABSTRACT

A power including a housing, a motor, a motor drive circuit, a trigger, and an electronic controller. The motor is located within the housing and is coupled to an output member. The trigger is configured to generate a trigger signal related to an activation of the trigger. The electronic controller is configured to receive the trigger signal from the trigger. The trigger signal corresponds to a first amount of activation of the trigger. The electronic controller is also configured to determine a magnitude of a characteristic associated with the first amount of activation of the trigger and modify the trigger signal based on the magnitude of the characteristic. The modified trigger signal corresponds to a second amount of activation of the trigger. The second amount of activation of the trigger is different than the first amount of activation of the trigger.

18 Claims, 13 Drawing Sheets

(56) References Cited

U.S. PATENT DOCUMENTS

| | | | |
|---|---|---|---|
| 2008/0021590 | A1 | 1/2008 | Vanko et al. |
| 2010/0114358 | A1 | 5/2010 | Krapf et al. |
| 2013/0187587 | A1 | 7/2013 | Knight et al. |
| 2013/0327552 | A1 | 12/2013 | Lovelass et al. |
| 2014/0338939 | A1 | 11/2014 | Shi |
| 2014/0367134 | A1 | 12/2014 | Phillips et al. |
| 2015/0101835 | A1 | 4/2015 | Nitsche et al. |
| 2015/0178620 | A1 | 6/2015 | Ascari et al. |
| 2016/0000025 | A1 | 1/2016 | Hamann et al. |
| 2016/0311094 | A1* | 10/2016 | Mergener ............ B25B 23/1475 |
| 2016/0342142 | A1 | 11/2016 | Boeck et al. |
| 2016/0361069 | A1 | 12/2016 | Ardel et al. |
| 2016/0375570 | A1 | 12/2016 | Boeck et al. |
| 2017/0090430 | A1 | 3/2017 | Nakazawa |
| 2017/0133965 | A1 | 5/2017 | Ichikawa et al. |
| 2017/0361434 | A1* | 12/2017 | Chien ................... B25B 13/461 |
| 2018/0328797 | A1 | 11/2018 | Gwon et al. |
| 2019/0126456 | A1 | 5/2019 | Abbott et al. |
| 2019/0187659 | A1 | 6/2019 | Li et al. |
| 2019/0227528 | A1 | 7/2019 | Abbott et al. |
| 2020/0156210 | A1 | 5/2020 | Sullivan et al. |
| 2020/0160152 | A1 | 5/2020 | Buttner et al. |
| 2020/0267903 | A1 | 8/2020 | Gao et al. |
| 2020/0276680 | A1 | 9/2020 | Green et al. |
| 2020/0326718 | A1 | 10/2020 | Kandemir et al. |
| 2020/0338677 | A1 | 10/2020 | Ozeki |
| 2020/0384618 | A1 | 12/2020 | Tanji et al. |
| 2021/0016894 | A1 | 1/2021 | Childress |
| 2021/0053212 | A1 | 2/2021 | Haetty |
| 2021/0101263 | A1 | 4/2021 | Hwang et al. |
| 2021/0101304 | A1 | 4/2021 | Green et al. |
| 2021/0104006 | A1 | 4/2021 | Green |
| 2021/0116894 | A1 | 4/2021 | Wichern et al. |
| 2021/0157297 | A1 | 5/2021 | Kaiser et al. |
| 2021/0166154 | A1 | 6/2021 | Ogino |
| 2021/0192386 | A1 | 6/2021 | Cabrita et al. |
| 2021/0205976 | A1 | 7/2021 | Matei |
| 2021/0240145 | A1 | 8/2021 | Abbott |
| 2021/0302921 | A1 | 9/2021 | Kolter et al. |
| 2021/0312262 | A1 | 10/2021 | Postel |
| 2021/0326663 | A1 | 10/2021 | Winston et al. |
| 2021/0374549 | A1 | 12/2021 | Willmott et al. |
| 2021/0383234 | A1 | 12/2021 | Bai et al. |
| 2021/0393337 | A1 | 12/2021 | Zucker |
| 2021/0394344 | A1 | 12/2021 | Mueckl et al. |
| 2022/0019900 | A1 | 1/2022 | Wong et al. |
| 2022/0050023 | A1 | 2/2022 | Lavazais et al. |
| 2022/0067913 | A1 | 3/2022 | Lutz et al. |
| 2022/0092466 | A1 | 3/2022 | Carbrita et al. |
| 2022/0100850 | A1 | 3/2022 | Sun et al. |
| 2022/0101116 | A1 | 3/2022 | Sheikholeslami et al. |
| 2022/0101143 | A1 | 3/2022 | Rice et al. |
| 2022/0108132 | A1 | 4/2022 | Zhang et al. |
| 2022/0111496 | A1 | 4/2022 | Beacham, Jr. et al. |
| 2022/0118595 | A1 | 4/2022 | Abbott et al. |
| 2022/0121177 | A1 | 4/2022 | Kerwin |
| 2022/0138510 | A1 | 5/2022 | Dai et al. |
| 2022/0138511 | A1 | 5/2022 | Xu et al. |
| 2022/0172061 | A1 | 6/2022 | Willmott et al. |
| 2022/0197227 | A1 | 6/2022 | Woehlke et al. |
| 2022/0261618 | A1 | 8/2022 | Garcia et al. |
| 2022/0266429 | A1 | 8/2022 | Erbele et al. |
| 2022/0292349 | A1 | 9/2022 | Stoll et al. |
| 2022/0299946 | A1 | 9/2022 | Abbott et al. |
| 2022/0313374 | A1 | 10/2022 | Jacobsen et al. |
| 2022/0318616 | A1 | 10/2022 | Kamble et al. |
| 2022/0347811 | A1 | 11/2022 | Abbott et al. |
| 2022/0395951 | A1* | 12/2022 | Bloomfield ............... B25F 5/00 |
| 2022/0405648 | A1 | 12/2022 | Lin et al. |
| 2022/0407274 | A1 | 12/2022 | Radtke et al. |
| 2022/0410360 | A1 | 12/2022 | Erbele et al. |
| 2023/0039379 | A1 | 2/2023 | Schmidt |
| 2023/0057100 | A1 | 2/2023 | Schirmer et al. |
| 2023/0100132 | A1 | 3/2023 | Rice et al. |
| 2023/0100765 | A1 | 3/2023 | Roderick et al. |
| 2023/0101812 | A1 | 3/2023 | Feng et al. |
| 2023/0102866 | A1 | 3/2023 | Bai et al. |
| 2023/0107463 | A1 | 4/2023 | Baharloui et al. |
| 2023/0107917 | A1 | 4/2023 | Pabbaraju et al. |
| 2023/0115313 | A1 | 4/2023 | Weber et al. |
| 2023/0115521 | A1 | 4/2023 | Kupcsik et al. |
| 2023/0141816 | A1 | 5/2023 | Butzerin et al. |
| 2023/0219204 | A1 | 7/2023 | Dieter et al. |
| 2023/0251614 | A1 | 8/2023 | Lutz et al. |
| 2023/0298315 | A1 | 9/2023 | Sheikholeslami et al. |
| 2023/0316067 | A1 | 10/2023 | Rudolph et al. |
| 2023/0321796 | A1 | 10/2023 | Speckman et al. |
| 2023/0339142 | A1 | 10/2023 | Mayer et al. |
| 2023/0356341 | A1 | 11/2023 | Volpert |
| 2023/0367269 | A1 | 11/2023 | Glennon et al. |
| 2023/0406344 | A1 | 12/2023 | Jiang et al. |
| 2024/0020638 | A1 | 1/2024 | Adcock et al. |
| 2024/0037282 | A1 | 2/2024 | Rice et al. |
| 2024/0037446 | A1 | 2/2024 | Vogt et al. |
| 2024/0051107 | A1 | 2/2024 | Petersson et al. |
| 2024/0070451 | A1 | 2/2024 | Zhang et al. |
| 2024/0096067 | A1 | 3/2024 | Mahmud et al. |
| 2024/0104339 | A1 | 3/2024 | Norouzzadeh et al. |
| 2024/0112455 | A1 | 4/2024 | He et al. |
| 2024/0139916 | A1 | 5/2024 | Baskaran et al. |
| 2024/0149411 | A1 | 5/2024 | Schuller et al. |
| 2024/0165774 | A1 | 5/2024 | Bajpai |
| 2024/0190032 | A1 | 6/2024 | Otto et al. |
| 2024/0198475 | A1 | 6/2024 | Bralla et al. |
| 2024/0198506 | A1 | 6/2024 | Leray et al. |
| 2024/0217082 | A1 | 7/2024 | Abbott et al. |
| 2024/0256961 | A1 | 8/2024 | Frischen et al. |
| 2024/0265262 | A1 | 8/2024 | Elsken et al. |
| 2024/0326223 | A1 | 10/2024 | Hayashi et al. |
| 2024/0333179 | A1 | 10/2024 | Abbott et al. |
| 2024/0347286 | A1 | 10/2024 | Abbott et al. |
| 2024/0367296 | A1 | 11/2024 | Nakamura et al. |
| 2024/0369431 | A1 | 11/2024 | Tang et al. |
| 2024/0369432 | A1 | 11/2024 | Tang et al. |
| 2024/0370774 | A1 | 11/2024 | Aldenfalk et al. |
| 2024/0395260 | A1 | 11/2024 | Namata et al. |

FOREIGN PATENT DOCUMENTS

| | | | |
|---|---|---|---|
| CN | 118393863 | A | 7/2024 |
| CN | 118393864 | A | 7/2024 |
| CN | 118393865 | A | 7/2024 |
| CN | 118393866 | A | 7/2024 |
| CN | 118393867 | A | 7/2024 |
| CN | 118393869 | A | 7/2024 |
| CN | 118393870 | A | 7/2024 |
| DE | 102016121029 | A1 | 5/2017 |
| DE | 102018210127 | A1 | 12/2019 |
| DE | 102019131627 | A1 | 5/2021 |
| DE | 102020205165 | A1 | 10/2021 |
| DE | 102020213080 | A1 | 4/2022 |
| DE | 102023200858 | A1 | 8/2024 |
| EP | 1398119 | A1 | 3/2004 |
| EP | 3623108 | A1 | 3/2020 |
| EP | 3716160 | A1 | 9/2020 |
| EP | 3770820 | A1 | 1/2021 |
| EP | 3772398 | A1 | 2/2021 |
| EP | 3913547 | A1 | 11/2021 |
| EP | 3950230 | A1 | 2/2022 |
| EP | 4357983 | A1 | 4/2024 |
| JP | 2012-200807 | A | 10/2012 |
| JP | 2022-153183 | A | 10/2022 |
| WO | 2009/138268 | A1 | 11/2009 |
| WO | 2017/162130 | A1 | 9/2017 |
| WO | 2020/073955 | A1 | 4/2020 |
| WO | 2021/042233 | A1 | 3/2021 |
| WO | 2021/060090 | A1 | 4/2021 |
| WO | 2021/241111 | A1 | 12/2021 |
| WO | 2023/000659 | A1 | 1/2023 |
| WO | 2023/076385 | A2 | 5/2023 |
| WO | 2023/076953 | A1 | 5/2023 |
| WO | 2023/076954 | A1 | 5/2023 |
| WO | 2023/076955 | A1 | 5/2023 |
| WO | 2023/110231 | A1 | 6/2023 |

(56) References Cited

FOREIGN PATENT DOCUMENTS

| | | | |
|---|---|---|---|
| WO | 2023/180247 | A1 | 9/2023 |
| WO | 2023/186501 | A1 | 10/2023 |
| WO | 2023/217792 | A1 | 11/2023 |
| WO | 2023/222382 | A1 | 11/2023 |
| WO | 2024/044660 | A1 | 2/2024 |
| WO | 2024/099933 | A1 | 5/2024 |
| WO | 2024/140217 | A1 | 7/2024 |
| WO | 2024/156515 | A1 | 8/2024 |

* cited by examiner

500

POWER TOOL IMPLEMENTING A DYNAMIC TRIGGER RESPONSE TO CONTROL THE POWER TOOL

RELATED APPLICATIONS

This application claims priority to U.S. Provisional Application No. 63/493,482, filed Mar. 31, 2023, the entire content of which is incorporated herein by reference.

FIELD

Embodiments described herein are related to the control of power tools.

SUMMARY

In one embodiment, a power tool including a housing, a motor, a motor drive circuit, a trigger, and an electronic controller is provided. The motor is located within the housing and is coupled to an output member. The motor drive circuit is configured to drive the motor. The trigger is configured to generate a trigger signal related to an activation of the trigger. The electronic controller is connected to the motor drive circuit. The electronic controller is configured to receive the trigger signal from the trigger. The trigger signal corresponds to a first amount of activation of the trigger. The electronic controller is also configured to determine a magnitude of a characteristic associated with the first amount of activation of the trigger and modify the trigger signal based on the magnitude of the characteristic. The modified trigger signal corresponds to a second amount of activation of the trigger. The second amount of activation of the trigger is different than the first amount of activation of the trigger. The electronic controller is also configured to control the motor drive circuit to drive the motor based on the modified trigger signal.

In another embodiment, a method for implementing a dynamic trigger response to control a power tool is provided. The method includes receiving a trigger signal from a trigger of the power tool. The trigger signal corresponds to a first amount of activation of the trigger. The method also includes determining a magnitude of a characteristic associated with the first amount of activation of the trigger. The method further includes modifying the trigger signal based on the magnitude of the characteristic. The modified trigger signal corresponds to a second amount of activation of the trigger and the second amount of activation of the trigger is different than the first amount of activation of the trigger. The method also includes driving a motor of the power tool based on the modified trigger signal.

In yet another embodiment, a power tool including a housing, a motor, a motor drive circuit, a trigger, and an electronic controller is provided. The is motor located within the housing and coupled to an output member. The motor drive circuit configured to drive the motor. The trigger is configured to generate a trigger signal related to an activation of the trigger. The electronic controller is coupled to the motor drive circuit and is configured to receive the trigger signal from the trigger. The trigger signal corresponds to a first amount of activation of the trigger. The electronic controller is also configured to determine a magnitude of a characteristic associated with the first amount of activation of the trigger and detect a change in the magnitude of the characteristic associated with the first amount of activation of the trigger. The electronic controller is further configured to modify the trigger signal based on the detected change in the magnitude of the characteristic. The modified trigger signal corresponds to a second amount of activation of the trigger and the second amount of activation of the trigger is different than the first amount of activation of the trigger. The electronic controller is further configured to control the motor drive circuit to drive the motor based on the modified trigger signal, receive feedback information related to the modified trigger signal, and modify a parameter that is used to adjust the modified trigger signal based on the received feedback information.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein provide dynamic trigger mapping or dynamic trigger response for a power tool. As an example, an input trigger signal can be exaggerated to make the power tool's response to the input trigger signal more responsive than a user may otherwise be capable of achieving through the manipulation of the trigger alone. For example, as the trigger is being pulled or actuated, the increasing value of the input trigger signal can be exaggerated to provide a higher output value than the input trigger signal would otherwise produce. Similarly, as the trigger is being released or de-actuated, the decreasing value of the input trigger signal can be exaggerated to provide a lower output value than the input trigger signal would otherwise produce. The result of such control is that the operation of the power tool will be more responsive to the input trigger signal without requiring any additional actions or controls from a user. In some embodiments, such dynamic trigger response or mapping is achieved using control theory. In some embodiments, such dynamic trigger response or mapping is achieved using machine learning control. In some embodiments, such dynamic trigger response or mapping is achieved using only hardware circuitry.

Figure 1:
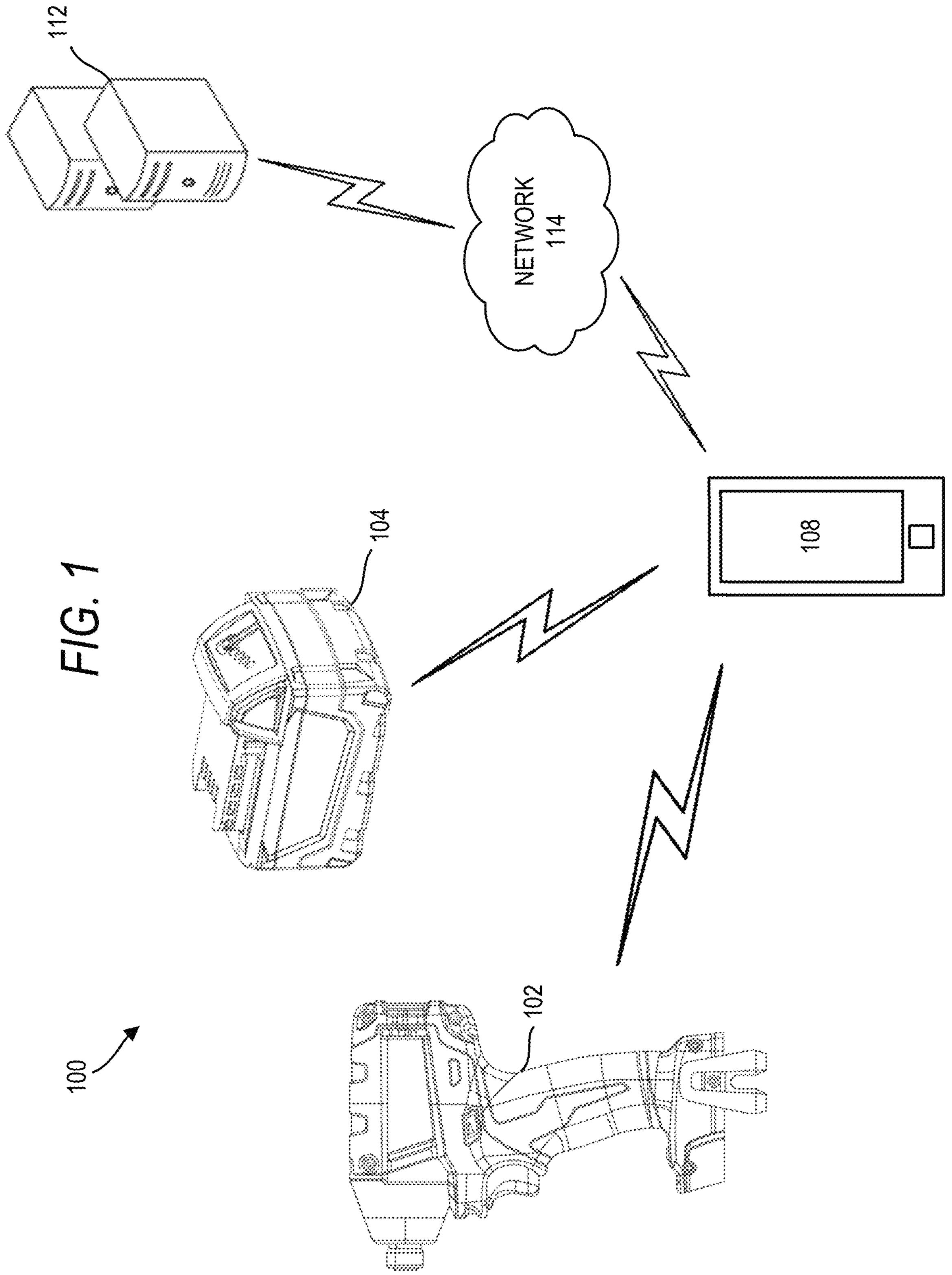
FIG. 1 illustrates a communication system, according to some embodiments.

FIG. 1 illustrates a communication system 100. The communication system 100 includes power tool devices 102, 104 and an external device 108. Each power tool device (e.g., power tool 102 and power tool battery pack 104) and the external device 108 can communicate wirelessly while they are within a communication range of each other. Each power tool device 102, 104 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool 102 has been used, whether maintenance is recommended or has been performed in the past, and identify malfunctioning components or other reasons for certain performance issues. The external device 108 is also configured to transmit data to the power tool 102 for power tool configuration, firmware updates, or to send commands (e.g., turn on a work light). The external device 108 also allows a user to set operational parameters, safety parameters, select tool modes, and the like for the power tool 102. The external device 108 may include, for example, a smartphone, a tablet computer, a laptop computer, a smart watch, and the like.

In addition, as shown in FIG. 1, the external device 108 can also share the information obtained from the power tool 102 with a server 112 (for example, a remote server) connected by a network 114. The server 112 may be used to store the data obtained from the external device 108, provide additional functionality and services to the user, or a combination thereof. In some embodiments, storing the information on the server 112 allows a user to access the information from a plurality of different locations. In another embodiment, the server 112 may collect information from various users regarding their power tool devices and provide statistics or statistical measures to the user based on information obtained from the different power tools. For example, the server 112 may provide statistics regarding the experienced efficiency of the power tool 102, typical usage of the power tool 102, and other relevant characteristics and/or measures of the power tool 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool devices 102, 104 may be configured to communicate directly with the server 112 through an additional wireless interface or with the same wireless interface that the power tool devices 102, 104 use to communicate with the external device 108.

In some embodiments, the external device 108 may include a short-range transceiver to communicate with the power tool 102 or battery pack 104, and a long-range transceiver to communicate with the server 112. In the illustrated embodiment, the power tool 102 and battery pack 104 also include a transceiver to communicate with the external device via, for example, a short-range communication protocol such as BLUETOOTH®. In some embodiments, the external device 108 bridges the communication between the power tool devices 102, 104 and the server 112. That is, the power tool devices 102, 104 transmit operational data to the external device 108, and the external device 108 forwards the operational data from the power tool devices 102, 104 to the server 112 over the network 114. The network 114 may be a long-range wireless network such as the Internet, a local area network ("LAN"), a wide area network ("WAN"), or a combination thereof. In other embodiments, the network 114 may be a short-range wireless communication network, and in yet other embodiments, the network 114 may be a wired network using, for example, USB cables. Similarly, the server 112 may transmit information to the external device 108 to be forwarded to the power tool devices 102, 104.

In some embodiments, the power tool 102 is equipped with a long-range transceiver instead of or in addition to the short-range transceiver. In such embodiments, the power tool devices 102, 104 communicates directly with the server 112. In some embodiments, the power tool devices 102, 104 may communicate directly with both the server 112 and the external device 108. In such embodiments, the external device 108 may, for example, generate a graphical user interface to facilitate control and programming of the power tool devices 102, 104, while the server 112 may store and analyze larger amounts of operational data for future programming or operation of the power tool devices 102, 104. In other embodiments, however, the power tool devices 102, 104 may communicate directly with the server 112 without utilizing a short-range communication protocol with the external device 108.

In some embodiments, the power tool 102 and power tool battery pack 104 may wirelessly communicate with each other via respective wireless transceivers within each device. For example, the power tool battery pack 104 may communicate a battery characteristic to the power tool 102 (e.g., a battery pack identification, a battery pack type, a battery pack weight, a current output capability of the battery pack 104, and the like). Such communication may occur while the battery pack 104 is coupled to the power tool 102. Additionally or alternatively, the battery pack 104 and the power tool 102 may communicate with each other using a communication terminal while the battery pack 104 is coupled to the power tool 102. For example, the communication terminal may be located near the battery terminals in the battery receiving portion.

In some embodiments, the power tool 102 periodically transmits the usage data to the server 112 based on a predetermined schedule (e.g., every eight hours). In other embodiments, the power tool 102 transmits the usage data after a predetermined period of inactivity (e.g., when the power tool 102 has been inactive for two hours), which may indicate that a session of operation has been completed. In some embodiments, the power tool 102 transmits the usage data in real time to the server 112 and may implement the updated thresholds and parameters in subsequent operations.

The power tool 102 is configured to perform one or more specific tasks (e.g., drilling, cutting, fastening, pressing, lubricant application, sanding, heating, grinding, bending, forming, impacting, polishing, lighting, etc.). For example, an impact wrench and a hammer drill are associated with the task of generating a rotational output (e.g., to drive a bit).

Figure 2:
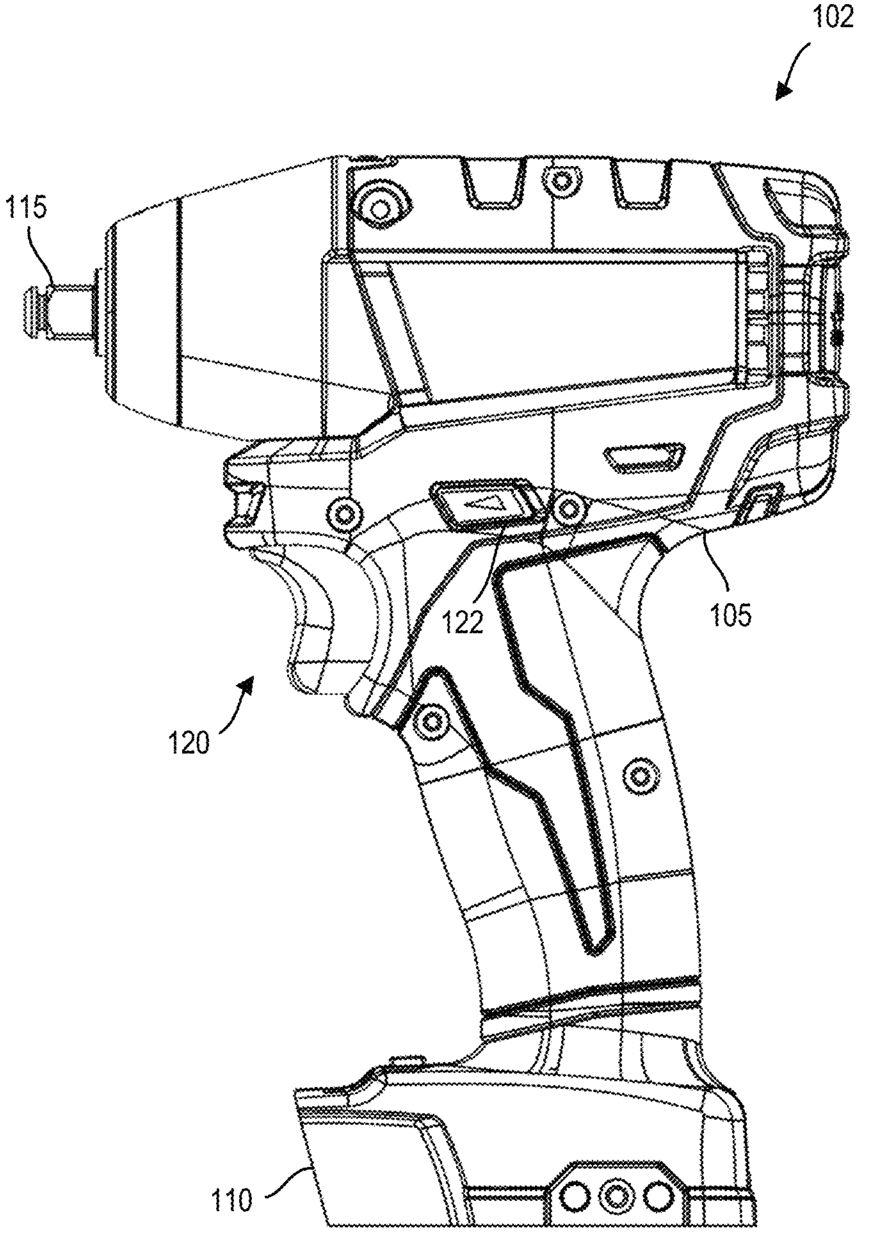
FIG. 2 illustrates a power tool including a trigger, according to some embodiments.

FIG. 2 illustrates the power tool 102 as described above with respect to FIG. 1 according to one embodiment. The power tool 102 includes a housing 105, a battery pack interface 110, a driver 115 (e.g., a chuck or bit holder), and an input, such as a trigger assembly 120. In some embodiments, the trigger assembly includes one or more sensors configured to determine a trigger position (e.g., distance traveled from an initial position) and/or pressure related to a user input. In some embodiments, the input may be considered a more generalized input, such as, for example, a pressure on a workpiece, a rotation controlled screwdriver, a pushing forwards rate (e.g., of a mower), a rotary dial, etc. The power tool 102 may further include a forward-reverse selector 122, which can allow a user to control the direction of a rotating portion of the tool. The power tool 102 may furthermore include a mode selector input or other user interface elements, such as a clutch ring, a gear selector, a speed selector, and the like.

While FIG. 2 shows a specific power tool with a rotational output, it is contemplated that the herein described dynamic trigger response operations may be used with multiple types of power tools, such as a circular saw, a jigsaw, a reciprocating saw, a bandsaw, a grinder, a cutoff saw, a tire buffer, a mud mixer, a bandfile, a polisher, a sander, a cutoff tool, a rotary hammer, a drill-driver, a hammer drill, a right angle drill, an impact driver, an impact wrench, a ratchet, a screwdriver, a crimper, a pipe threader, a pump, a cable cutter, a cable stripper, a rod cutter, a tube cutter, a pipe shear, a knockout tool, a PEX expander, an inflator, a compressor, a sewer drum, a transfer pump, a drain snake, a rivet tool, a heat gun, a grease gun, a caulk gun, a chain hoist, a track saw, a miter saw, a table saw, a multi-tool, a router, a planer, a vacuum, a fan, a blower, a mower, etc., or another type of power tool that uses, for example, a brushless DC motor, AC motor, a brushed motor, stepper motor, or the like, that is controlled via a user input (e.g. a trigger). In some embodiments, various types of power tools can utilize a speed control, a power control, a torque control, a PWM control, etc., based on a trigger input.

Figure 3A:
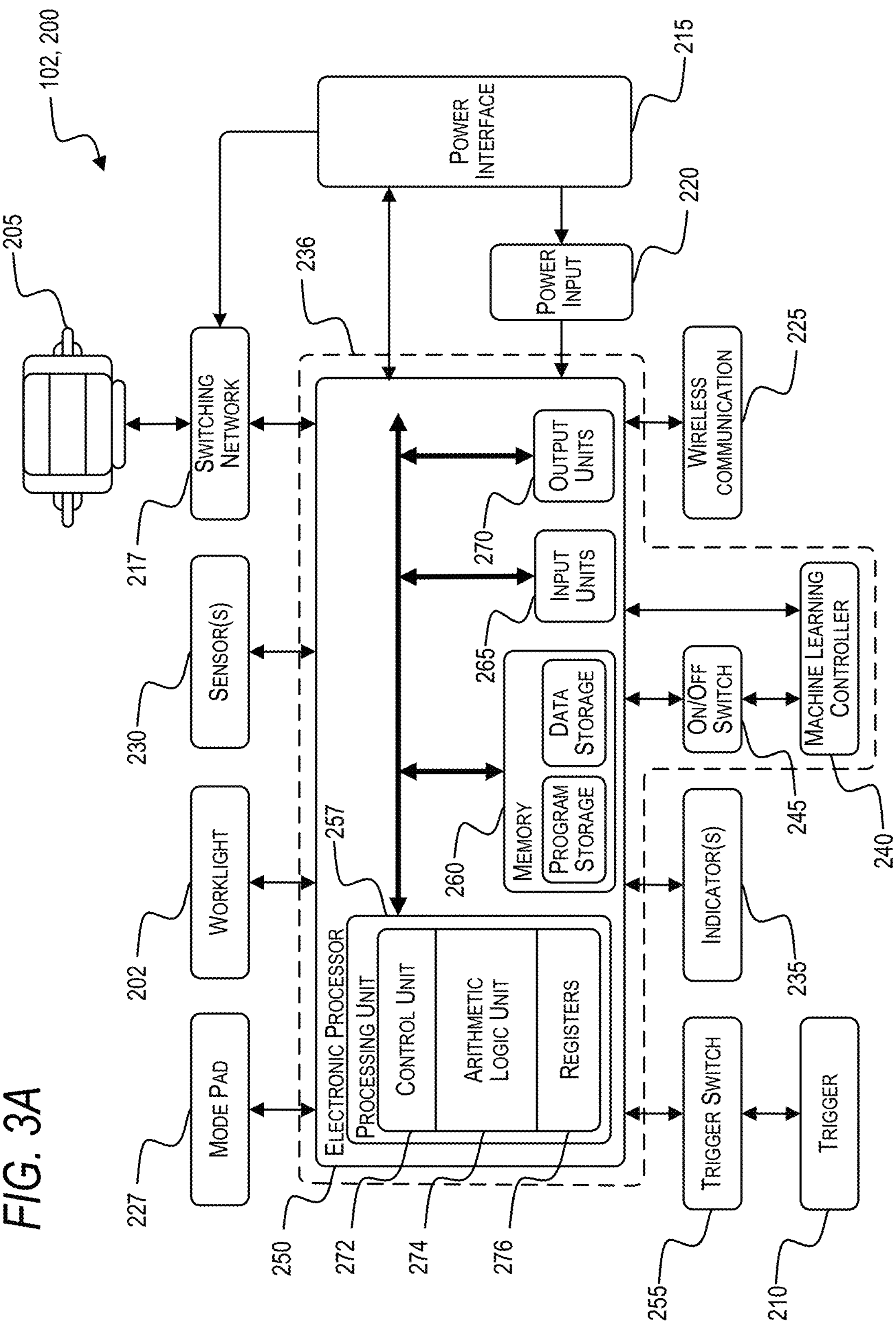
FIG. 3A is a block diagram of an example power tool of FIG. 2, according to some embodiments.

FIG. 3A is a block diagram of a representative power tool 200 and including a machine learning controller 240. Similar to the example power tool 102 of FIG. 1, the power tool 200 is representative of various types of power tools. Accordingly, the description with respect to the power tool 200 is similarly applicable to other types of power tools. The machine learning controller 240 of the power tool 200 may be a static machine learning controller, an adjustable machine learning controller, a self-updating machine learning controller, etc. Although the power tool 200 of FIG. 3A is described as being in communication with the external device 108 or with a server 112, in some embodiments, the power tool 200 is self-contained or closed, in terms of machine learning, and does not need to communicate with the external device 108 or the server 112 to perform the functionality of the machine learning controller 240 described in more detail below. In some embodiments, the power tool 200 does not include the machine learning controller 240.

As shown in FIG. 3A, the power tool 200 includes a worklight 202, a motor 205, a trigger 210, a power interface 215, a switching network 217, a power input control 220, a wireless communication device 225, a mode pad 227, a plurality of sensors 230, a plurality of indicators 235, and an electronic control assembly 236. The electronic control assembly 236 includes the machine learning controller 240, an activation switch 245, and an electronic processor 250. The motor 205 actuates a drive device of the power tool 200 and allows the drive device to perform the particular task for the power tool 200. In some embodiments, the motor 205 is directly or indirectly coupled (for example, via the drive device) to an output member. The motor 205 receives power from an external power source through the power interface 215. In some embodiments, the external power source includes an AC power source. In such embodiments, the power interface 215 includes an AC power cord that is connectable to, for example, an AC outlet. In other embodiments, the external power source includes a battery pack, such as the battery pack 104. In such embodiments, the power interface 215 includes a battery pack interface. The battery pack interface may include a battery pack receiving portion on the power tool 200 that is configured to receive and couple to a battery pack (e.g., the battery pack 104). The battery pack receiving portion may include a connecting structure to engage a mechanism that secures the battery pack and a terminal block to electrically connect the battery pack to the power tool 200.

The motor 205 is energized based on a state of the trigger 210. Generally, when the trigger 210 is activated, the motor 205 is energized, and when the trigger 210 is deactivated, the motor 205 is de-energized. In some embodiments, the trigger 210 extends partially down a length of the handle of the power tool and is moveably coupled to the handle such that the trigger 210 moves with respect to the power tool housing. In the illustrated embodiment, the trigger 210 is coupled to a trigger switch 255 such that when the trigger 210 is depressed, the trigger switch 255 is activated, and when the trigger is released, the trigger switch 255 is deactivated. In the illustrated embodiment, the trigger 210 is biased (e.g., with a biasing member such as a spring) such that the trigger 210 moves in a second direction away from the handle of the power tool 200 when the trigger 210 is released by the user. In other words, the default state of the trigger switch 255 is to be deactivated unless a user presses the trigger 210 and activates the trigger switch 255. In some embodiments, the trigger 210 may be distant from the power tool housing. In some implementations, the trigger 210 is connected to the power tool 102, 200 via a mechanical linkage (e.g., a cable) or an electrical link (e.g., a signal sent wirelessly in remote control applications).

The switching network 217 enables the electronic processor 250 to control the operation of the motor 205. The switching network 217 includes a plurality of electronic switches (e.g., FETs, bipolar transistors, and the like) connected together to form a network that controls the activation of the motor 205 using a pulse-width modulated (PWM) signal. For instance, the switching network 217 may include a six-FET bridge that receives pulse-width modulated (PWM) signals from the electronic processor 250 to drive the motor 205. Generally, when the trigger 210 is depressed as indicated by an output of the trigger switch 255, electrical current is supplied from the power interface 215 to the motor 205 via the switching network 217. When the trigger 210 is not depressed, electrical current is not supplied from the power interface 215 to the motor 205.

In response to the electronic processor 250 receiving the activation signal from the trigger switch 255, the electronic processor 250 activates the switching network 217 to provide power to the motor 205. The switching network 217 controls the amount of current available to the motor 205 and thereby controls the speed and torque output of the motor 205. The mode pad 227 allows a user to select a mode of the power tool 200 and indicates to the user the currently selected mode of the power tool 200. In some embodiments, the mode pad 227 includes a single actuator. In such embodiments, a user may select an operating mode for the power tool 200 based on, for example, a number of actuations of the actuator of the mode pad 227. For example, when the user activates the actuator three times, the power tool 200 may operate in a third operating mode. In some embodiments, the mode pad 227 includes a plurality of actuators, each actuator corresponding to a different operating mode. For example, the mode pad 227 may include four actuators, when the user activates one of the four actuators, the power tool 200 may operate in a first operating mode. The electronic processor 250 receives a user selection of an operating mode via the mode pad 227, and controls the switching network 217 such that the motor 205 is operated according to the selected operating mode. In some embodiments, the power tool 200 does not include a mode pad 227. In such embodiments, the power tool 200 may operate in a single mode, or may include a different selection mechanism for selecting an operation mode for the power tool 200.

The sensors 230 are coupled to the electronic processor 250 and communicate to the electronic processor 250 various output signals indicative of different parameters of the power tool 200 or the motor 205. The sensors 230 include, for example, Hall Effect sensors, motor current sensors, motor voltage sensors, temperature sensors, torque sensors, a microphone, position sensors (e.g., laser, radio frequency [RF], laser imaging, detection, and ranging [LIDAR], or the like) or movement sensors, such as accelerometers or gyroscopes, chemical sensors, pressure sensors, force sensors, and the like. The Hall Effect sensors output motor feedback information to the electronic processor 250 such as an indication (e.g., a signal, a pulse signal, etc.) related to the motor's position, velocity, and/or acceleration of the rotor of the motor 205. In some embodiments, the electronic processor 250 uses the motor feedback information from the Hall Effect sensors to control the switching network 217 to drive the motor 205. For example, by selectively enabling and disabling the switching network 217, power is selectively provided to the motor 205 to cause rotation of the motor 205 at a specific speed, a specific torque, or a combination thereof. The electronic processor 250 may also control the operation of the switching network 217 and the motor 205 based on other sensors included in the power tool 200. For example, in some embodiments, the electronic processor 250 changes the control signals based on a sensor output signal indicating a number of impacts delivered by the power tool 200, a sensor output signal indicating a speed of an anvil of the power tool 200, and the like. The output signals from the sensors are used to ensure proper timing of control signals to the switching network 217 and, in some instances, to provide closed-loop feedback to control the speed of the motor 205 to be within a target range or at a target level. In some embodiments, as described in more detail below, the electronic processor 250 may also control the operation of the switching network 217 and the motor 205 by automatically adjusting an electrical current supplied from the power interface 215 to the motor 205 using, for example, the machine learning controller 240.

The indicators 235 are also coupled to the electronic processor 250. The indicators 235 receive control signals from the electronic processor 250 to generate, for example, a visual signal to convey information regarding the operation or state of the power tool 200 to the user. The indicators 235 may include, for example, LEDs or a display screen and may generate various signals indicative of, for example, an operational state or mode of the power tool 200, an abnormal condition or event detected during the operation of the power tool 200, and the like. For example, the indicators 235 may indicate measured electrical characteristics of the power tool 200, the state or status of the power tool 200, an operating mode of the power tool 200 (as described in further detail below), and the like. In some embodiments, the indicators 235 include elements to convey information to a user through audible or tactile outputs. In some embodiments, the power tool 200 does not include the indicators 235. In some embodiments, the operation of the power tool 200 alerts the user regarding a power tool condition. For example, a fast deceleration of the motor 205 may indicate that an abnormal condition is present. In some embodiments, the power tool 200 communicates with the external device 108, and the external device 108 generates a graphical user interface that conveys information to the user without the need for indicators 235 on the power tool 200 itself.

The power interface 215 is coupled to the power input control 220. The power interface 215 transmits the power received from the external power source to the power input control 220. The power input control 220 includes active and/or passive components (e.g., voltage step-down controllers, voltage converters, rectifiers, filters, etc.) to regulate or control the power received through the power interface 215 to the electronic processor 250 and other components of the power tool 200, such as the wireless communication device 225.

The wireless communication module or wireless communication device 225 is coupled to the electronic processor 250. In the example power tools 102, 200 of FIGS. 1-3A, the wireless communication device 225 can be located near the foot of the power tool 102, 200 to save space and ensure that the magnetic activity of the motor 205 does not affect the wireless communication between the power tool 200 and the server 112 or with the external device 108. In a particular example, the wireless communication device 225 is positioned under the mode pad 227. The wireless communication device 225 may include, for example, a radio transceiver and antenna, a memory, a processor, and a real-time clock. The radio transceiver and antenna operate together to send and receive wireless messages to and from the external device 108, or the server 112 and the electronic processor 250. The memory of the wireless communication device 225 stores instructions to be implemented by the processor and/or may store data related to communications between the power tool 200 and the external device 108 or the server 112. The processor for the wireless communication device 225 controls wireless communications between the power tool 200 and the external device 108 or the server 112. For example, the processor of the wireless communication device 225 buffers incoming and/or outgoing data, communicates with the electronic processor 250, and determines the communication protocol and/or settings to use in wireless communications.

In some embodiments, the wireless communication device 225 is a Bluetooth® controller. The Bluetooth® controller communicates with the external device 108 or server 112 employing the Bluetooth® protocol. In such embodiments, therefore, the external device 108 or server 112 and the power tool 200 are within a communication range (i.e., in proximity) of each other while they exchange data. In other embodiments, the wireless communication device 225 communicates using other protocols (e.g., Wi-Fi, cellular protocols, a proprietary protocol, etc.) over a different type of wireless network. For example, the wireless communication device 225 may be configured to communicate via Wi-Fi through a wide area network such as the Internet or a local area network, or to communicate through a piconet (e.g., using infrared or NFC communications). The communication via the wireless communication device 225 may be encrypted to protect the data exchanged between the power tool 200 and the external device 108 or server 112 from third parties.

In some embodiments, the wireless communication device 225 includes a real-time clock (RTC). The RTC increments and keeps time independently of the other power tool components. The RTC receives power from the power interface 215 when an external power source is connected to the power tool 200, and may receive power from a back-up power source when the external power source is not connected to the power tool 200. The RTC may time stamp the operational data from the power tool 200. Additionally, the RTC may enable a security feature in which the power tool 200 is disabled (e.g., locked-out and made inoperable) when the time of the RTC exceeds a lockout time determined by the user.

The wireless communication device 225, in some embodiments, exports tool usage data, maintenance data, mode information, drive device information, and the like from the power tool 200 (e.g., from the electronic processor 250). The exported data may indicate, for example, when work was accomplished and that work was accomplished to specification. The exported data can also provide a chronological record of work that was performed, track duration of tool usage, and the like. The server 112 receives the exported information, either directly from the wireless communication device 225 or through an external device 108, and logs the data received from the power tool 200. As discussed in more detail below, the exported data can be used by the power tool 200, the external device 108, or the server 112 to train or adapt a machine learning controller relevant to similar power tools. The wireless communication device 225 may also receive information from the server 112 or the external device 108, such as configuration data, operation threshold, maintenance threshold, mode configurations, programming for the power tool 200, updated machine learning controllers for the power tool 200, and the like.

In some embodiments, the power tool 200 does not include the wireless communication device 225. In some embodiments, the power tool 200 includes a wired communication interface to communicate with, for example, the external device 108. The wired communication interface may provide a faster communication route than the wireless communication device 225.

In some embodiments, the power tool 200 includes a data sharing setting. The data sharing setting indicates what data, if any, is exported from the power tool 200 to the external device 108 or server 112. In some embodiments, the power tool 200 receives (e.g., via a graphical user interface generated by the external device 108) an indication of the type of data to be exported from the power tool 200. In some embodiments, the external device 108 may display various options or levels of data sharing for the power tool 200, and the external device 108 receives the user's selection via its generated graphical user interface. For example, the power tool 200 may receive an indication that only usage data (e.g., motor current and voltage, number of impacts delivered, torque associated with each impact, and the like) is to be exported from the power tool 200, but may not export information regarding, for example, the modes implemented by the power tool 200, the location of the power tool 200, and the like. In some embodiments, the data sharing setting may be a binary indication of whether or not data regarding the operation of the power tool 200 (e.g., usage data) is transmitted to the server 112. The power tool 200 receives the user's selection for the data sharing setting and stores the data sharing setting in memory to control the communication of the wireless communication device 225 according to the selected data sharing setting.

The electronic control assembly 236 is electrically and/or communicatively connected to a variety of modules or components of the power tool 200. The electronic control assembly 236 controls the motor 205 based on the outputs and determinations from the machine learning controller 240. In particular, the electronic control assembly 236 includes the electronic processor 250 (also referred to as an electronic controller), the machine learning controller 240, and the activation switch 245. In some embodiments, the electronic processor 250 includes a plurality of electrical and electronic components that provide power, operational control, and protection to the components and modules within the electronic processor 250 and/or power tool 200. For example, the electronic processor 250 includes, among other things, a processing unit 257 (e.g., a microprocessor, a microcontroller, or another suitable programmable device), a memory 260, input units 265, and output units 270. The processing unit 257 includes, among other things, a control unit 272, an arithmetic logic unit ("ALU") 274, and a plurality of registers 276. In some embodiments, the electronic processor 250 is implemented partially or entirely on a semiconductor (e.g., a field-programmable gate array ["FPGA" ] semiconductor) chip or an Application Specific Integrated Circuit ("ASIC"), such as a chip developed through a register transfer level ("RTL") design process.

The memory 260 includes, for example, a program storage area and a data storage area. The program storage area and the data storage area can include combinations of different types of memory, such as read-only memory ("ROM"), random access memory ("RAM") (e.g., dynamic RAM ["DRAM" ], synchronous DRAM ["SDRAM" ], etc.), electrically erasable programmable read-only memory ("EEPROM"), flash memory, a hard disk, an SD card, or other suitable magnetic, optical, physical, or electronic memory devices. The processing unit 257 is connected to the memory 260 and executes software instructions that are capable of being stored in a RAM of the memory 260 (e.g., during execution), a ROM of the memory 260 (e.g., on a generally permanent basis), or another non-transitory computer readable medium such as another memory or a disc. Software included in the implementation of the power tool 200 can be stored in the memory 260 of the electronic processor 250. The software includes, for example, firmware, one or more applications, program data, filters, rules, one or more program modules, and other executable instructions. In some embodiments, the machine learning controller 240 may be stored in the memory 260 of the electronic processor 250 and are executed by the processing unit 257.

In some embodiments, the machine learning controller 240 receives, as an input, one or more settings of the power tool 200. For example, the power tool 200 can have settings, such as an adjustable clutch, modes (e.g., for hammer drilling, screwing, or drilling), gear settings (e.g., for bigger or smaller gear ratios), speed dials, etc. In some embodiments, the machine learning controller 240 can receive, as an input, information about an attached accessory, use of a nearby tool, or other factor that provides contextual information about the power tool 200. The machine learning controller 240 may use the additional settings and information to process the activations of the trigger. For example, an ideal dynamic response of the trigger 210 may be less for a light torque screw application of the power tool 200.

Generally, when a trigger, such as the trigger 210, is actuated, the electronic control assembly 236 uses one or more predefined trigger mapping functions or profiles to generate an output which is then used to drive the switching network 217 to control operation of the motor 205. For example, these mappings can be functions that directly map the trigger depression output (e.g., trigger signal) to a target value. The output of the trigger 210 is generated by the one or more trigger sensors and generally processed by the electronic control assembly 236 using, for example, an analog-to-digital converter ("ADC"). However, in some embodiments, the trigger sensors may not include the ADC circuitry. The electronic control assembly 236 then attempts to control the motor 205 to reach the target value. However, forces such as friction (both static and kinetic) and resistive forces (e.g., pressure due to a sealed compartment within the trigger assembly 120) can cause the force applied to the trigger 210 to not be a direct function of the trigger depression distance. These forces can result in trigger maps and subsequent outputs that do not accurately reflect the intent of the user where they are based only on, for example, position or force.

The electronic processor 250 is configured to retrieve from memory 260 and execute, among other things, instructions related to the control processes and methods described herein. In some embodiments, as described in more detail below, the power tool 200 (e.g., the electronic control assembly 236) automatically selects a trigger mapping profile for the power tool 200 using, for example, the machine learning controller 240 in order to exaggerate a characteristic of a trigger signal from the trigger 210 (e.g., exaggerate an increase in trigger pull, exaggerate a decrease in trigger pull, etc.). The electronic processor 250 is also configured to store power tool information in the memory 260 including tool usage information, information identifying the type of tool, a unique identifier for the particular tool, user characteristics (e.g., identity, trade type, skill level), and other information relevant to operating or maintaining the power tool 200 (e.g., received from an external source, such as the external device 108 or pre-programed at the time of manufacture). The tool usage information, such as current levels, motor speed, motor acceleration, motor direction, number of impacts, may be captured or inferred from data output by the sensors 230. More particularly, Table 1 shows example types of tool usage information which may be captured or inferred by the electronic processor 250.

TABLE 1

| Type of data | Time-series data | Non-time-series data |
|---|---|---|
| Raw data | Trigger, current, voltage, speed, torque, temperature, motion, timing between events (ex: impacts), etc. | Duration, date, time, time, time since last use, mode, clutch setting, direction, battery type, presence of side-handle, errors, history of past applications and switching rate, user input, external inputs, gear etc. |
| Derived features | Filtered values of raw data, fast Fourier transforms (FFTs), subsampled/pooled data, fitted parameters (ex: polynomial fits), PCA, features generated by encoder [decoder] networks, derived features (ex: estimated energy, momentum, inertia of system), derivatives/ integrals/functions/ accumulators of parameters, padded data, sliding window of data, etc. | Principal component analysis (PCA), features generated by encoder [decoder] networks, likelihood matrix of application/history, functions of inputs, etc. |

In some embodiments, the power tool 102, the battery pack 104, the external device 108, or the server 112 may include the machine learning controller 240 that implements a machine learning program. A transceiver allows the power tool 102, the battery pack 104, the external device 108, or the server 112 to receive tool usage data from the power tool 102 and store the received tool usage data in memory, and, in some embodiments, uses the received tool usage data for building or adjusting the machine learning controller 240.

The machine learning controller 240 is configured to construct a model (e.g., building one or more algorithms) based on example inputs. Supervised learning involves presenting a computer program with example inputs and their actual outputs (e.g., categorizations). The machine learning controller 240 is configured to learn a general rule or model that maps the inputs to the outputs based on the provided example input-output pairs. The machine learning algorithm may be configured to perform machine learning using various types of methods. For example, the machine learning controller 240 may implement the machine learning program using decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others, such as those listed in Table 2 below.

TABLE 2

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naïve Bayes, etc. |

The machine learning controller 240 is programmed and trained to perform a particular task. For example, in some embodiments, the machine learning controller 240 is trained to predict a target output of the power tool 102. The task for which the machine learning controller 240 is trained may vary based on, for example, the type of power tool, a selection from a user, typical applications for which the power tool is used, and the like. Analogously, the way in which the machine learning controller 240 is trained also varies based on the particular task. In particular, the training examples used to train the machine learning controller 240 may include different information and may have different dimensions based on the task of the machine learning controller 240. In the example mentioned above in which the machine learning controller 240 is configured to predict a target output of the power tool 102, each training example may include a set of inputs such as a trigger input (e.g., trigger signal). Each training example also includes a specified output. For example, when the machine learning controller 240 identifies a characteristic of a trigger signal, a training example may have an output that includes a particular target output of a trigger mapping of the power tool 102. Other training examples, including different values for each of the inputs and an output indicating that the trigger input is, for example, increasing or decreasing, a rate of increase or decrease, etc. The training examples may be previously collected training examples, from, for example, a plurality of the same type of power tools. For example, the training examples may have been previously collected from, for example, two hundred power tools of the same type (e.g., drills) over a span of, for example, one year.

A plurality of different training examples are provided to the machine learning controller 240. The machine learning controller 240 uses these training examples to generate a model (e.g., a rule, a set of equations, and the like) that helps categorize or estimate the output based on new input data. The machine learning controller 240 may weigh different training examples differently to, for example, prioritize different conditions or outputs from the machine learning controller 240. In some embodiments, the training examples are weighted differently by associating a different cost function or value to specific training examples or types of training examples.

In some embodiments, the machine learning controller 240 implements an artificial neural network. The artificial neural network typically includes an input layer, a plurality of hidden layers or nodes, and an output layer. Typically, the input layer includes as many nodes as inputs provided to the machine learning controller 240. As described above, the number (and the type) of inputs provided to the machine learning controller 240 may vary based on the particular task for the machine learning controller 240. Accordingly, the input layer of the artificial neural network of the machine learning controller 240 may have a different number of nodes based on the particular task for the machine learning controller 240. The input layer connects to the hidden layers. The number of hidden layers varies and may depend on the particular task for the machine learning controller 240. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 240, but may also vary based on the specific type of hidden layer implemented.

Each hidden layer may perform a different function. For example, some hidden layers can be convolutional hidden layers which can, in some instances, reduce the dimensionality of the inputs, while other hidden layers can perform more statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs. In the example above in which the machine learning controller 240 predicts a target output of the power tool 102, the output layer may include, for example, four nodes. A first node may indicate that the target output corresponds to a first trigger mapping profile, a second node may indicate that the use application corresponds to a second trigger mapping profile, a third node may indicate that the target output corresponds to a third trigger mapping profile, and the fourth node may indicate that the target output corresponds to an unknown (or unidentifiable) trigger mapping profile. In some embodiments, the machine learning controller 240 then selects the output node with the highest value and indicates it to the power tool 200. In some embodiments, the machine learning controller 240 may also select more than one output node. The machine learning controller 240 or the electronic processor 250 may then use the multiple outputs to control the power tool 200. The machine learning controller 240 or the electronic processor 250 may then, for example, control the motor 205 according to the speed for the first and the second mapping profiles (e.g., an average of the two mapping profiles). The machine learning controller 240 and the electronic processor 250 may implement different methods of combining the outputs from the machine learning controller 240.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training algorithms can be used to adjust the bias values and the weights of the node connections based on the training examples. The training algorithms may include, for example, gradient descent, newton's method, conjugate gradient, quasi newton, levenberg marquardt, among others.

In some embodiments, the machine learning controller 240 implements a support vector machine to perform a classification. The machine learning controller 240 may, for example, classify a mapping profile. In such embodiments, the machine learning controller 240 may receive an input, such as, trigger signal associated with the power tool 200. The machine learning controller 240 then defines a margin using combinations of some of the input variables (e.g., current, voltage, etc.) as support vectors to maximize the margin. In some embodiments, the machine learning controller 240 defines a margin using combinations of more than one of similar input variables. The margin corresponds to the distance between the two closest vectors that are classified differently. For example, the margin corresponds to the distance between a vector representing a first trigger mapping profile and a vector that represents a second trigger mapping profile. In some embodiments, a single support vector machine can use more than two input variables and define a hyperplane that separates those trigger signals that are of the first trigger mapping profile from the trigger signals that are the second trigger mapping profile.

The training examples for a support vector machine include an input vector including values for the input variables, and an output classification indicating whether the trigger signal represents the first trigger mapping profile or the second trigger mapping profile. During training, the support vector machine selects the support vectors (e.g., a subset of the input vectors) that maximize the margin. In some embodiments, the support vector machine may be able to define a line or hyperplane that accurately separates the trigger signals that are an increasing trigger signal (e.g., user is pulling the trigger assembly 120) from those that a decreasing trigger signal (e.g., user is releasing the trigger assembly 120). In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data. In other embodiments, as mentioned above, the machine learning controller 240 can implement different machine learning algorithms to make an estimation or classification based on a set of input data. Some examples of input data, processing technique, and machine learning algorithm pairings are listed below in Table 3. The input data, listed as time series data in the below table, includes, for example, one or more of the various examples of time-series tool usage information described herein.

TABLE 3

| Input Data | Data Processing | Exemplary Model |
|---|---|---|
| Time Series Data | N/A | RNN (using LSTM) |
| Time Series Data | Filtering (e.g. low-pass filters) | DNN classifier/regression, or another non-recurrent algorithm |
| Time Series Data | Sliding window, padding, or data subset | DNN classifier/regression, or another non-recurrent algorithm |
| Time Series Data | Make features (e.g. summarize analysis of runtime data) | KNN or another non-recurrent or recurrent algorithm |
| Time Series Data | Initial (e.g. pre-trained) model | Model adaptation |
| Time Series Data | Initial RNN or DNN analysis for classification | Markov Model (for likely tool application determination during or between tool operations) |

For example, the power tool 200 sends the usage information to the trained machine learning controller 240. The machine learning controller 240 then generates an estimated value or classification based on the input usage information. The power tool 200 can also generate recommendations for future operations of the power tool 200. For example, the trained machine learning controller 240 may determine that the trigger signal is a decreasing signal of a second mapping profile. The electronic processor 250 may then determine that a slower motor speed for the trigger signal received may increase responsiveness of the power tool 200 to the input of the user.

In some embodiments, the machine learning controller 240 may detect a change in a trigger signal during operation of the power tool 200 utilizing a first mapping profile. The machine learning controller 240 may then adjust a motor speed threshold of the first mapping profile such that the motor speed of the power tool 200 is increased after the change of the trigger signal is detected. In another example, the machine learning controller 240 may adjust a motor speed of the power tool 200 by selecting a second mapping profile that includes a motor speed threshold that is higher than the motor speed threshold of the first mapping profile. In some embodiments, the increased motor speed or other motor characteristics (e.g., torque, power) are achieved via field weakening/phase advance techniques. In some embodiments, mechanical braking, boost circuitry, motor winding changes (e.g., series to parallel, parallel to series, wye to delta, delta to wye, etc.), and other techniques can be used to increase the response to the trigger signal. In some embodiments, changes in commutation (field weakening, centerline commutation, boost circuitry, different motor controller methods, different switching frequencies, etc.) can be used to allow more output beyond a typical motor control output. For example, an input percentage (usually a value assumed from 0% to 100%) could exceed a nominal 100%.

In some embodiments, the power tool 200 receives the machine learning controller 240 during manufacturing, while in other embodiments, a user of the power tool 200 may select to receive the machine learning controller 240 after the power tool 200 has been manufactured and, in some embodiments, after operation of the power tool 200. Accordingly, during future operations of the power tool 200, the machine learning controller 240 analyzes new usage data from the power tool 200 and generates recommendations or actions based on the new usage data. In other embodiments, the machine learning controller 240 of the power tool 200 is adjustable instead of, for example, a static machine learning controller. In these embodiments, the adjustable machine learning controller 240 of the power tool 200 receives updated versions of the machine learning program, which replaces previous versions, from, for example, the server 112 over the network 114.

In some embodiments, the power tool 200 transmits feedback to the server 112 (via, for example, the external device 108) regarding the operation of the adjustable machine learning controller 240. The power tool 200, for example, may transmit an indication to the server 112 regarding the number of operations that were incorrectly classified by the adjustable machine learning controller 240. The server 112 receives the feedback from the power tool 200, updates the machine learning program, and provides the updated program to the adjustable machine learning controller 240 to reduce the number of operations that are incorrectly classified. Thus, the server 112 can update or re-train the adjustable machine learning controller 240 in view of the feedback received from the power tool 200. In some embodiments, the server 112 also uses feedback received from similar power tools to adjust the adjustable machine learning controller 240. In some embodiments, the server 112 updates the adjustable machine learning controller 240 periodically (e.g., every month). In other embodiments, the server 112 updates the adjustable machine learning controller 240 when the server 112 receives a predetermined number of feedback indications (e.g., after the server 112 receives two feedback indications). The feedback indications may be positive (e.g., indicating that the adjustable machine learning controller 240 correctly classified a condition, event, operation, or combination thereof), or the feedback may be negative (e.g., indicating that the adjustable machine learning controller 240 incorrectly classified a condition, event, operation, or combination thereof).

In some embodiments, the server 112 also utilizes new usage data received from the power tool 200 and other similar power tools to update the adjustable machine learning controller 240. For example, the server 112 may periodically re-train (or adjust the training) of the adjustable machine learning controller 240 based on the newly received usage data.

When the power tool 200 receives the updated version of the adjustable machine learning controller 240 (e.g., when an updated machine learning program is provided to and stored on the machine learning controller 240), the power tool 200 replaces the current version of the adjustable machine learning controller 240 with the updated version. In some embodiments, the power tool 200 is equipped with a first version of the adjustable machine learning controller 240 during manufacturing. In such embodiments, the user of the power tool 200 may request newer versions of the adjustable machine learning controller 240. In some embodiments, the user may select a frequency with which the adjustable machine learning controller 240 is transmitted to the power tool 200.

In some embodiments, the power tool 200 includes a self-updating machine learning controller 240. The self-updating machine learning controller 240 is first loaded on the power tool 200 during, for example, manufacturing. The self-updating machine learning controller 240 updates itself. In other words, the self-updating machine learning controller 240 receives new usage information from the sensors in the power tool 200, feedback information indicating desired changes to operational parameters (e.g., user wants to increase motor speed or output torque), feedback information indicating whether the classification made by the machine learning controller 240 is incorrect, or a combination thereof. The self-updating machine learning controller 240 then uses the received information to re-train the self-updating machine learning controller 240. Since the power tool 200 includes, for example, the self-updating machine learning controller 240, the power tool 200 can implement the machine learning controller 240, receive user feedback, and update the machine learning controller 240 without communicating with the external device 108 or the server 112.

In some embodiments, the power tool 200 re-trains the self-updating machine learning controller 240 when the power tool 200 is not in operation. For example, the power tool 200 may detect when the motor 205 has not been operated for a predetermined time period, and start a re-training process of the self-updating machine learning controller 240 while the power tool 200 remains non-operational. Training the self-updating machine learning controller 240 while the power tool 200 is not operating allows more processing power to be used in the re-training process instead of competing for computing resources typically used to operate the power tool 200.

In some embodiments, the server 112 may also re-train the self-updating machine learning controller 240, for example, as described above. The server 112 may use additional training examples from other similar power tools. Using these additional training examples may provide greater variability and ultimately make the machine learning controller 240 more reliable. Accordingly, in some embodiments, the self-updating machine learning controller 240 may be re-trained on the power tool 200, by the server 112, or with a combination thereof. In some embodiments, the server 112 does not re-train the self-updating machine learning controller 240, but still exchanges information with the power tool 200.

The machine learning controller 240 is coupled to the electronic processor 250 and to the activation switch 245. The activation switch 245 switches between an activated state and a deactivated state. When the activation switch 245 is in the activated state, the electronic processor 250 is in communication with the machine learning controller 240 and receives decision outputs from the machine learning controller 240. When the activation switch 245 is in the deactivated state, the electronic processor 250 is not in communication with the machine learning controller 240. In other words, the activation switch 245 selectively enables and disables the machine learning controller 240. As described above, the machine learning controller 240 can include a trained machine learning controller that utilizes previously collected power tool usage data to analyze and classify new usage data from the power tool 200. As explained in more detail below, the machine learning controller 240 can identify conditions, applications, and/or states of the power tool, etc. In some embodiments, the activation switch 245 switches between an activated state and a deactivated state. In such embodiments, while the activation switch 245 is in the activated state, the electronic processor 250 controls the operation of the power tool 200 (e.g., changes the operation of the motor 205) based on the determinations from the machine learning controller 240. Otherwise, when the activation switch 245 is in the deactivated state, the machine learning controller 240 is disabled and the machine learning controller 240 does not affect the operation of the power tool 200. In some embodiments, however, the activation switch 245 switches between an activated state and a background state. In such embodiments, when the activation switch 245 is in the activated state, the electronic processor 250 controls the operation of the power tool 200 based on the determinations or outputs from the machine learning controller 240. However, when the activation switch 245 is in the background state, the machine learning controller 240 continues to generate output based on the usage data of the power tool 200 and may calculate (e.g., determine) thresholds or other operational levels, but the electronic processor 250 does not change the operation of the power tool 200 based on the determinations and/or outputs from the machine learning controller 240. In other words, in such embodiments, the machine learning controller 240 operates in the background without affecting the operation of the power tool 200. In some embodiments, the activation switch 245 is not included on the power tool 200 and the machine learning controller 240 is maintained in the enabled state or is controlled to be enabled and disabled via, for example, wireless signals from the server (e.g., server 112) or from the external device 108.

Figure 3B:
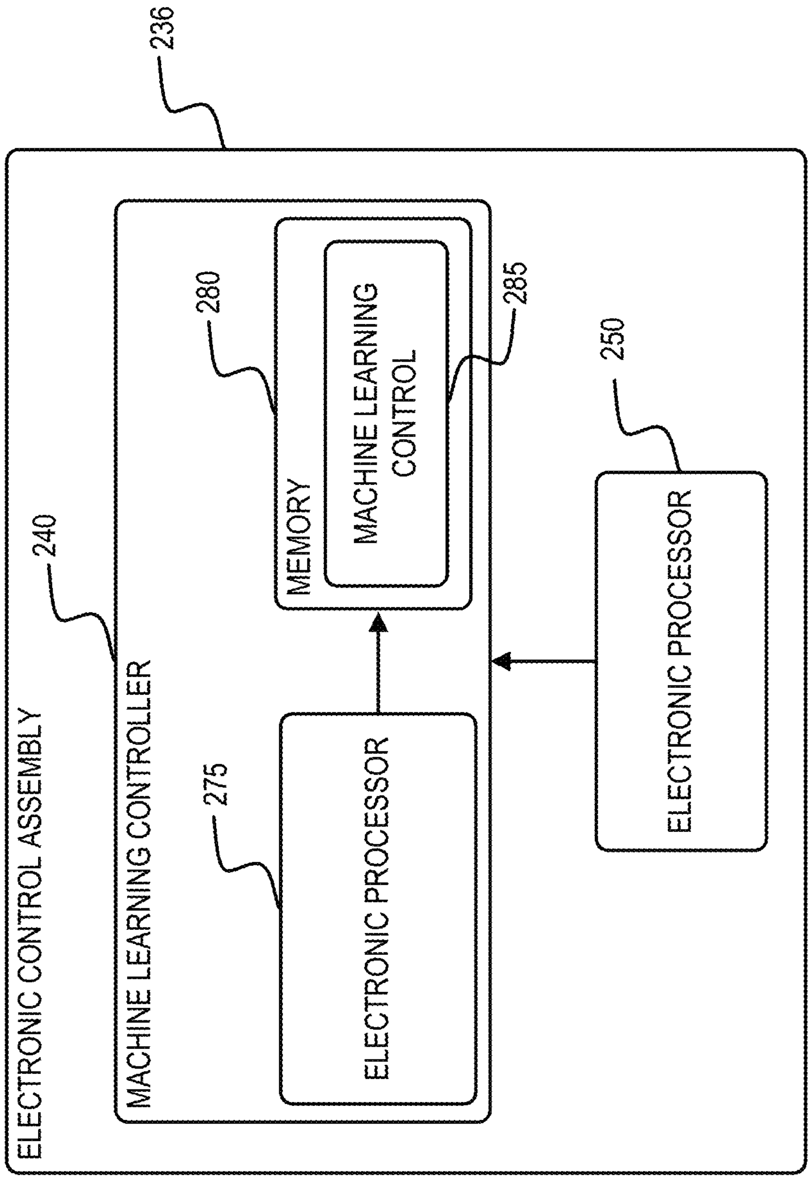
FIG. 3B is a block diagram of a machine learning controller of the power tool of FIG. 3A, according to some embodiments.

As shown in FIG. 3B, the machine learning controller 240 can include an electronic processor 275 and a memory 280. The memory 280 stores a machine learning control 285. The machine learning control 285 may include a trained machine learning program, as described above. In the illustrated embodiment, the electronic processor 275 includes a graphics processing unit. In the embodiment of FIG. 3B, the machine learning controller 240 is positioned on a separate printed circuit board (PCB) as the electronic processor 250 of the power tool 200. The PCB of the electronic processor 250 and the machine learning controller 240 are coupled with, for example, wires or cables to enable the electronic processor 250 of the power tool 200 to control the motor 205 based on the outputs and determinations from the machine learning controller 240. In other embodiments, however, the machine learning control 285 may be stored in memory 260 of the electronic processor 250 and may be implemented by the processing unit 257. In such embodiments, the electronic control assembly 236 includes the electronic processor 250. In some embodiments, the machine learning controller 240 is implemented in the electronic processor 275, but is positioned on the same PCB as the electronic processor 250 of the power tool 200. Embodiments with the machine learning controller 240 implemented as a separate processing unit from the electronic processor 250, whether on the same or different PCBs, allows selecting a processing unit to implement each of the machine learning controller 240 and the electronic processor 250 that has its capabilities (e.g., processing power and memory capacity) tailored to the particular demands of each unit. Such tailoring can reduce costs and improve efficiencies of the power tools. In some embodiments, the external device 108 includes the machine learning controller 240 and the power tool 200 communicates with the external device 108 to receive the estimations or classifications from the machine learning controller 240. In some embodiments, the machine learning controller 240 is implemented in a plug-in chip or controller that can be added to the power tool 200. For example, the machine learning controller 240 may include a plug-in chip that is received within a cavity of the power tool 200 and connects to the electronic processor 250. For example, in some embodiments, the power tool 200 includes a lockable compartment including electrical contacts that is configured to receive and electrically connect to the plug-in machine learning controller 240. The electrical contacts enable bidirectional communication between the plug-in machine learning controller 240 and the electronic processor 250, and enable the plug-in machine learning controller 240 to receive power from the power tool 200.

Figure 4:
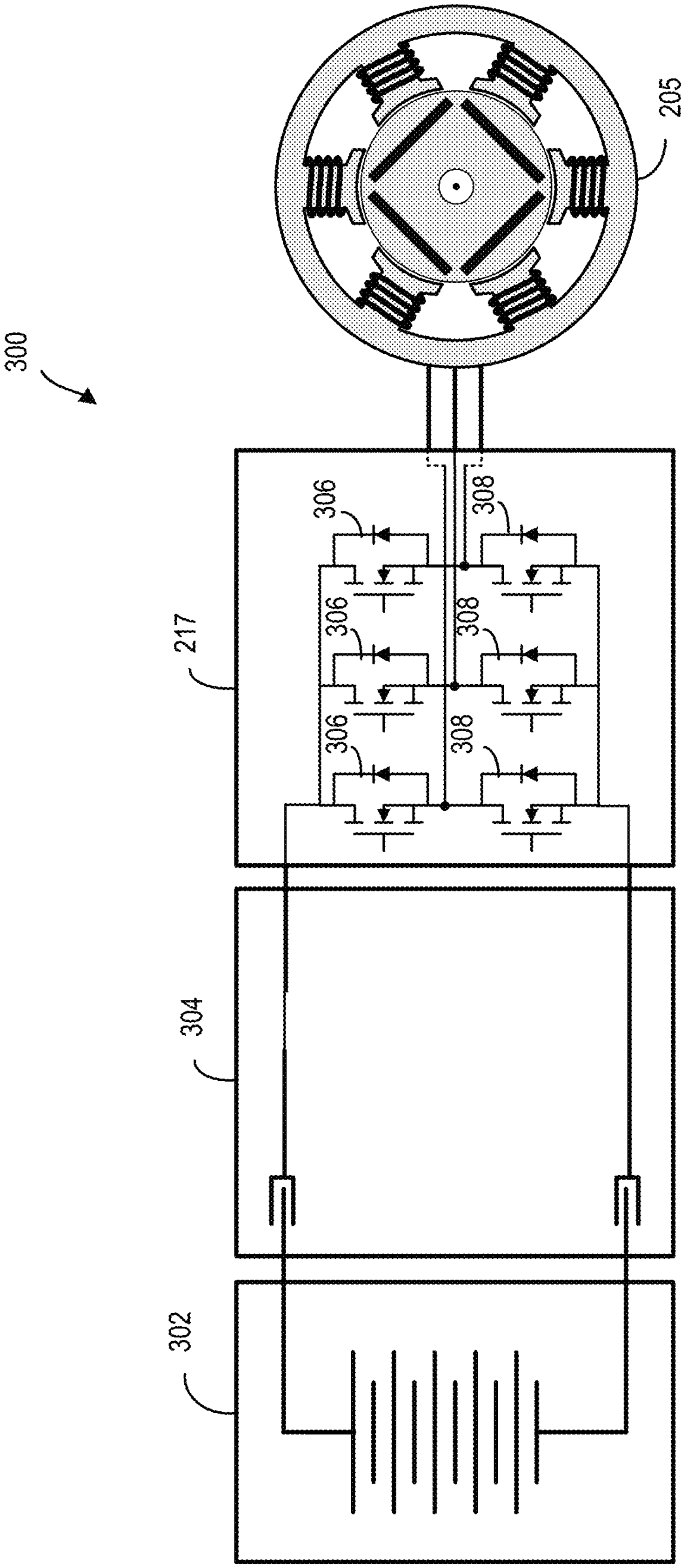
FIG. 4 is a circuit diagram of a power switching network, according to some embodiments.

FIG. 4 illustrates a circuit diagram of a motor drive circuit 300. The motor drive circuit 300 is described with respect to the power tool 200, and includes a power supply 302 (e.g., the battery pack 104), the switching network 217, and the motor 205. The power supply 302 is coupled to the power tool 200 via a power connection 304. In some embodiments, the power connection 304 is the power interface 215 described above. The switching network 217 includes a number of high side power switching elements 306 (e.g., field effect transistors [FETs]) and a number of low side power switching elements 308 (e.g., FETs). The electronic processor 250 provides the control signals to control the high side power switching elements 306 and the low side power switching elements 308 to drive the motor 205 based on the motor feedback information and user controls described above. For example, in response to detecting a pull of the trigger 210, the electronic processor 250 provides the control signals to selectively enable and disable the power switching elements 306 and 308 (e.g., sequentially, in pairs) resulting in power from the power supply 302 to be selectively applied to stator coils of the motor 205 to cause rotation of a rotor. More particularly, to drive the motor 205, the electronic processor 250 enables a first high side power switching element 306 and first low side power switching element 308 pair (e.g., by providing a voltage at a gate terminal of the power switching elements) for a first period of time. In response to determining that the rotor of the motor 205 has rotated based on a pulse from the Hall effect sensors, the electronic processor 250 disables the first power switching element pair and enables a second high side power switching element 306 and a second low side power switching element 308. In response to determining that the rotor of the motor 205 has rotated based on pulse(s) from the Hall effect sensors, the electronic processor 250 disables the second power switching element pair and enables a third high side power switching element 306 and a third low side power switching element 308. This sequence of cyclically enabling pairs of high side power switching elements 306 and low side power switching elements 308 repeats to drive the motor 205. Further, in some embodiments, the control signals include pulse width modulation (PWM) signals having a duty cycle that is set according to the amount of trigger pull of the trigger 210 (as indicated by the output of the trigger sensors), to thereby control the speed or torque of the motor 205.

Figure 5:
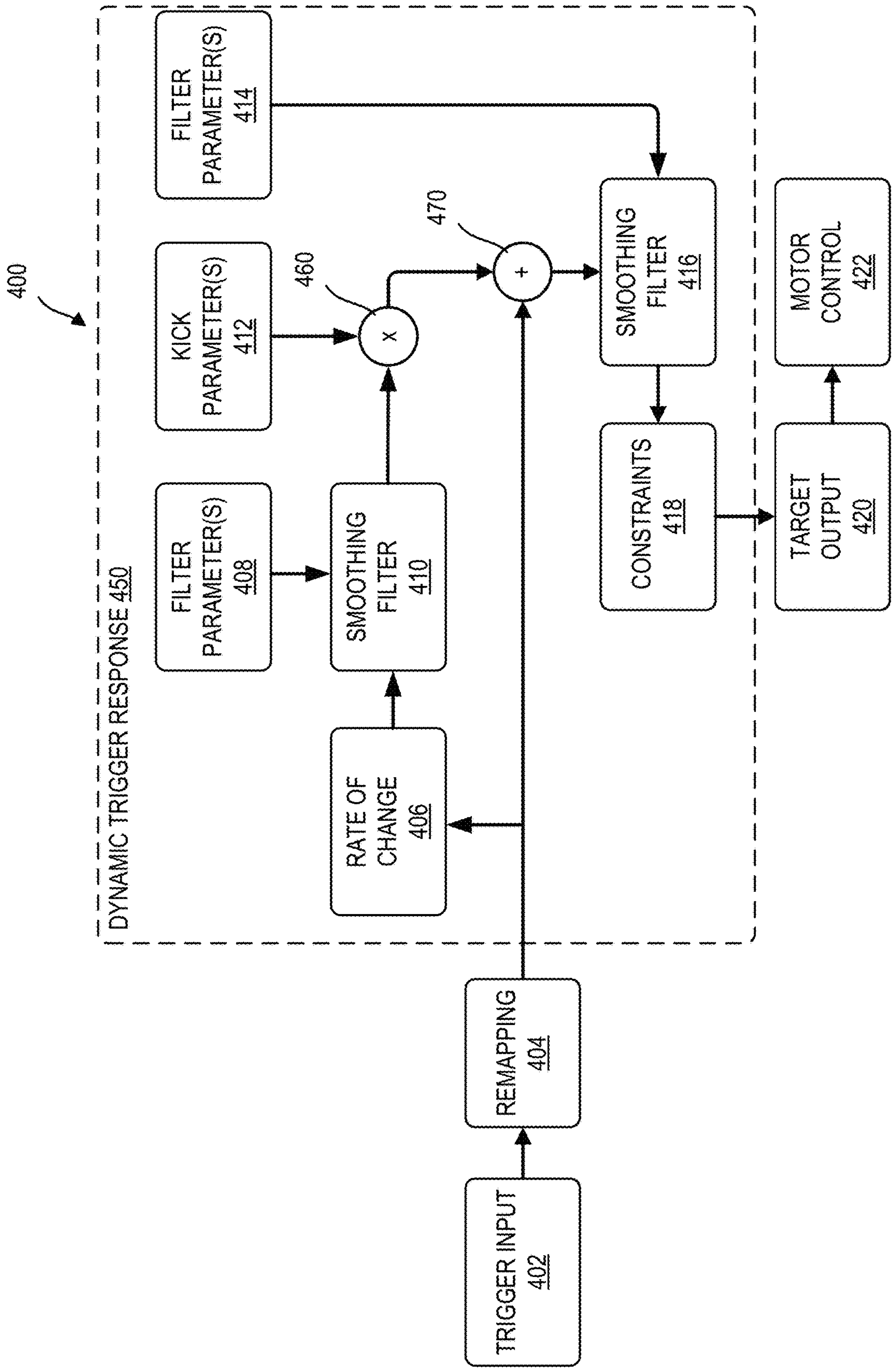
FIG. 5 illustrates a schematic control diagram of a power tool, according to some embodiments.

FIG. 5 illustrates a schematic control diagram 400 of the power tool 200, according to some embodiments. In general, the electronic processor 250 receives numerous inputs, makes determinations based on the inputs, generates outputs, and controls the switching network 217 based on the inputs, determinations, and outputs. The schematic control diagram 400 uses those inputs to implement a dynamic trigger response for the power tool 200. In some embodiments, the dynamic trigger response of FIG. 5 is independent of any machine learning and can be implemented in the power tool 200 that does not include the machine learning controller 240. The schematic control diagram 400 includes a trigger input block 402, a remapping block 404, a target output block 420, a motor control block 422, and a dynamic trigger response 450. The dynamic trigger response 450 illustrates how the electronic processor 250 implements a dynamic trigger response in the schematic control diagram 400, according to some embodiments. The dynamic trigger response 450 includes a rate of change block 406, a filter parameters block 408, a smoothing filter block 410, a kick parameters block 412, a filter parameters block 414, a smoothing filter block 416, and a constraints block 418. In some embodiments, when implementing the dynamic trigger response, the electronic processor 250 isolates a higher frequency component of the trigger signal, performs calculations, smoothing, and scaling of the component, and combines the component with the trigger signal. The electronic processor 250 generates a control signal that increases faster than a raw trigger input signal based on the component and the trigger signal that results in the motor 205 of the power tool 200 being more responsive to the trigger input provided by a user. In some embodiments, the remapping block 404 in the schematic control diagram 400 is optional or could occur in various places. For example, the remapping block 404 can be removed from the schematic control diagram 400. In another example, the remapping block 404 can be placed after smoothing filter block 416. In another example, the remapping block 404 can be employed both after the trigger input block 402 and after the smoothing filter block 416.

As shown in FIG. 5, the electronic processor 250 receives a trigger signal at the trigger input block 402 from the trigger 210, as described above. For example, the trigger input block 402 provides an output that includes the trigger signal that corresponds to a first drive speed of the motor 205 (e.g., a desired speed of the motor 205 based on an amount of depression of the trigger 210 or based on the setting of the secondary input device, such as, for example a remapping block 404). In another example, the trigger input block 402 provides an output that corresponds to a desired duty ratio (e.g., a value between 0-100%) of a PWM signal for controlling the switching network 217. In some embodiments, the schematic control diagram 400 includes the remapping block 404 that receives a user input that modifies conditions associated with the dynamic trigger response 450 implemented by the electronic processor 250. For example, the remapping block 404 is an interface that allows a user to input settings that are used to modify a set of parameters used by the electronic processor 250 to modify a mapping of an output of the trigger input block 402 or adjust a modified trigger signal. The input settings may include mode settings, configuration settings, contextual information, and the like of the power tool 200. In these embodiments, the remapping block 404 provides the user input and the trigger signal to the dynamic trigger response 450 for processing by the electronic processor 250.

In some embodiments, the electronic processor 250 receives the output of the trigger input block 402 and detects a change in the output of the trigger input block 402 at the rate of change block 406. For example, the electronic processor 250 detects a change in a characteristic (e.g., current of trigger signal, voltage of trigger signal, etc.) of the trigger signal output at the trigger input block 402. In this example, the electronic processor 250 determines a rate of change of the characteristic of the trigger signal at the rate of change block 406. In some embodiments, the electronic processor 250 provides the rate of change that is determined to the smoothing filter block 410.

In some embodiments, at the smoothing filter block 410, the electronic processor 250 receives a rate of change output of the rate of change block 406. The electronic processor 250 applies a smoothing filter (e.g., ramps, low pass filters, second order filters, non-linear filters, bandpass filters, other frequency filters, etc.) to the rate of change output to reduce abrupt changes (e.g., spikes) in the rate of change outputs received. In some embodiments, the rate of change outputs of the rate of change block 406 are received over a defined time period (e.g., the time-series data). In other embodiments, the smoothing filter block 410 receives a filter parameter from the filter parameters block 408. In some embodiments, the power tool 200 includes different filter parameter settings for an increasing or decreasing trigger signal. The electronic processor 250 uses the filter parameter to control the extent of the smoothing of the rate of change outputs. In some embodiments, the electronic processor 250 sets the filter parameter of the filter parameters block 408 based on preferences of a user associated with a user input at the remapping block 404. In some embodiments, delayed sensor values or delayed commanded output values can also be used to control the output.

At a node 460, the electronic processor 250 combines the output of the smoothing filter block 410 with an output of the kick parameters block 412. The output of the kick parameters block 412 may include a parameter related to a condition of the power tool 200. In some embodiments, the power tool 200 includes different kick parameter settings for an increasing (e.g., trigger being pulled) or decreasing (trigger being released) trigger signal. In some embodiments, a look-up table can be used to look at past trigger values (e.g., 20 ms in the past, 10 ms in the past, etc.) to help derive an output. An output of the node 460 is the product of the output of the smoothing filter block 410 and the output of the kick parameters block 412. In some embodiments, the electronic processor 250 uses the parameter of the kick parameters block 412 as a scaling factor to adjust the output of the smoothing filter block 410. In some implementations, the parameter of the kick parameters block 412 may be a sensitivity parameter related to an orientation/position of the power tool 200, which may indicate the occurrence of a condition of the power tool 200. In this example, the condition of the power tool 200 may be a kickback condition (e.g., the power tool is bound in a workpiece). In some embodiments, the electronic processor 250 sets the parameter of the kick parameters block 412 based on preferences of a user associated with a user input at the remapping block 404 as discussed above. In some embodiments, the electronic processor 250 sets the parameter of the kick parameters block 412 based on a nominal level of a trigger signal of the trigger input block 402, a setting of the power tool 200, an application (e.g., selected or predicted) of the power tool 200, etc.

In some embodiments, at a node 470, the electronic processor 250 combines the output of the node 460 with the output of the trigger input block 402 that includes the trigger signal. An output of the node 470 is the sum of the output of the trigger input block 402 and the output of the node 460. The output of the node 470 results in an adjustment to the output of the trigger input block 402 that increases the effects of the change that is detected at the rate of change block 406 on the output of the trigger input block 402.

In some embodiments, at the smoothing filter block 416, the electronic processor 250 receives the output of the node 470. The electronic processor 250 applies a smoothing filter to the output of the node 470 to reduce abrupt changes (e.g., spikes) in the outputs received. In some embodiments, the outputs of the node 470 are received over a defined time period (e.g., the time-series data). In some embodiments, the smoothing filter block 416 receives a filter parameter from the filter parameters block 414. The electronic processor 250 uses the filter parameter to control the extent of the smoothing of the outputs of the node 470. In some embodiments, the electronic processor 250 sets the filter parameter of the filter parameters block 414 based on preferences of a user associated with a user input at the remapping block 404 discussed above.

In some embodiments, at the constraints block 418, the electronic processor 250 receives the output of the smoothing filter block 416. The electronic processor 250 applies constraints to the output of the smoothing filter block 416. For example, the constraints may include limitations to ensure a signal corresponding to the output of the smoothing filter block 416 is sufficiently smooth. The constraints may also include bounds and penalties that affect max ramp, power, and speed rates. In some embodiments, the electronic processor 250 provides the output of the constraints block 418 to the target output block 420 (e.g., based on thermal management considerations, demagnetization, etc.). In some embodiments, the dynamic trigger response can be compensated or adjusted for a power tool with a slower response that is due to power tool or grease temperature, a weak battery pack, user hand stiffness, tool age, tool condition, motor demagnetization, etc. Furthermore, the dynamic trigger response may risk higher loads placed on the power tool, decreased motor efficiency, higher heat generation, and increased vibration. For this reason, parameters associated with the dynamic trigger control may be adjusted or activated based on other power tool system factors. For example, these factors may include battery health and/or state of charge, a thermal condition, an expected runtime requirement, availability of other nearby power sources, enabling of an eco-mode, vibration quotas, etc.

At the target output block 420, the electronic processor 250 receives the output of the constraints block 418. The electronic processor 250 generates an output that includes a target output value based on the output of the constraints block 418. For example, the target output block 420 provides an output that includes an adjusted trigger signal that corresponds to a second drive speed of the motor 205. In another example, the trigger input block 402 provides an output that corresponds to a desired duty ratio (e.g., a value between 0-100%) of a PWM signal for controlling the switching network 217. In some embodiments, the electronic processor 250 provides the output of the target output block 420, which includes the target output value, to the motor control block 422. At, the motor control block 422, the electronic processor 250 controls the motor 205 to reach the target output value (e.g., speed, power, torque, angle, or other motor controls). Although FIG. 5 is primarily described with respect to the electronic processor 250 being configured to implement many of the steps to the control process, in some embodiments, the control process of FIG. 5 is implemented separate from the electronic processor 250 (e.g., in hardware, hardware and software, hardware and software separate from the electronic processor 250, etc.). In some embodiments, the control process of FIG. 5 can be carried out by a combination of the electronic processor 250 and separate hardware and/or software.

While FIG. 5 depicts a primary embodiment of such a dynamic trigger response, there are other control methodologies that more generally can be characterized as a trigger "trim" control. The "trim" control modifies an input characteristic to a system. For example, rather than a signal rate of change filter, a similar effect could be achieved by implementing an FFT transform and then augmenting higher order frequencies of an input signal before transforming back into the time domain. In another example, a control methodology can use a query process that, for example, references at least one historical value of the trigger such that rather than an analytical derivation of a target output, the target output is queried. While FIG. 5 references a rate of change block 406, there can be other dynamic characteristics of an input that could be substituted or additionally used in the derivation of the trigger input.

In some embodiments, rational sensor checks are used to inspect whether the trigger input signal of trigger input block 402 is rational. In some instances, the trigger input signal of trigger input block 402 may be subject to sudden shocks, noise, and dropout. The trigger 210 may also use logic for debounce, wake time, potential railing, temperature compensation, etc.

Figure 6:
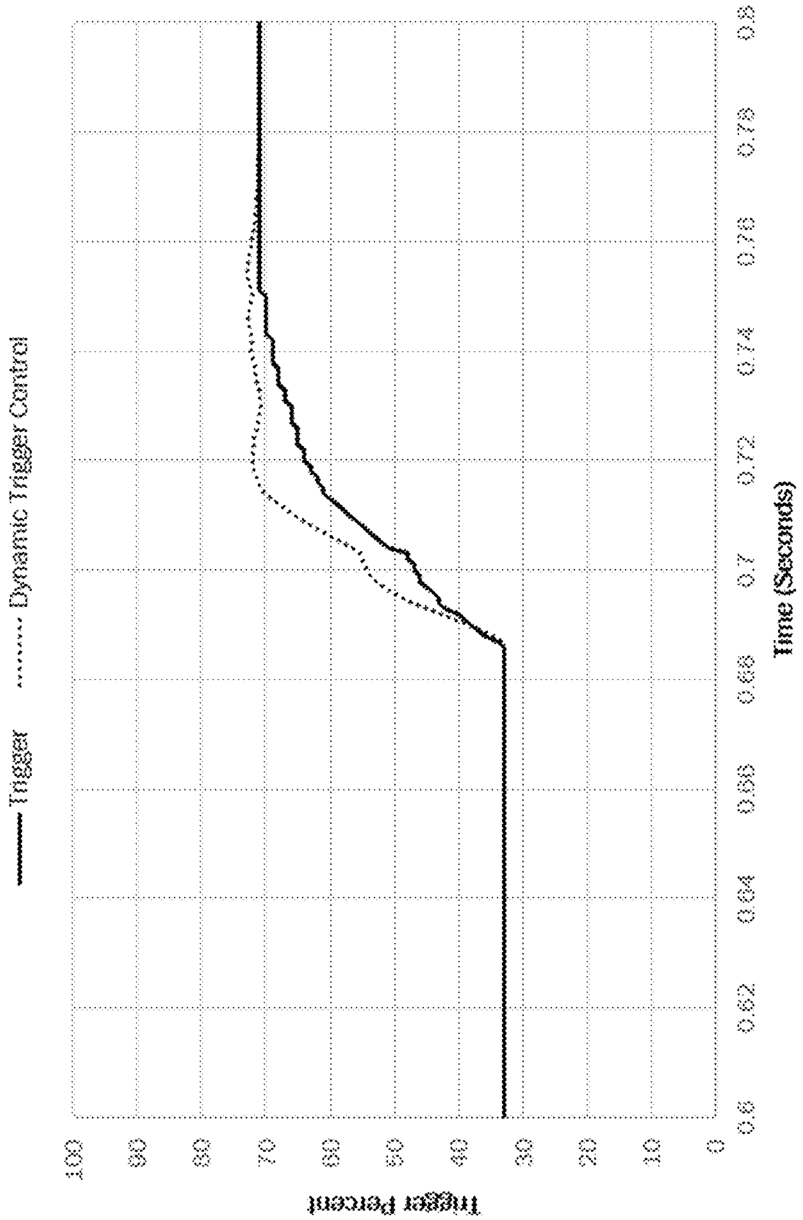
FIG. 6 illustrates a graph of a dynamic trigger response, according to some embodiments.

FIG. 6 depicts a graph 500 that illustrates a plot of an input trigger signal and an adjusted trigger signal of the schematic control diagram 400 of FIG. 5, according to some embodiments. The graph 500 includes a first axis that measures an amount of a trigger signal (e.g., a percent of full trigger pull) and a second axis that measures the time corresponding to the amount of the trigger signal. The graph 500 includes two (2) line plots of trigger signal values based on the same trigger pull. A first line plot, represented by a solid line, represents a raw trigger signal of the trigger input block 402. A second line plot, represented by a dotted line, represents an adjusted trigger signal of the dynamic trigger response 450. The second line plot illustrates a trigger response that includes amount values that are reached approximately ten (10) ms ahead of the first line plot. Thus, the power tool 200 receiving the adjusted trigger signal of the second line plot, for example, would feel more responsive to a user using the same trigger pull.

While FIG. 6 shows an input trigger signal that is increasing, the dynamic trigger control in a decreasing setting is also advantageous to a user. For example, in screw seating applications, users may want a tool to rapidly slow for precise depth control of a fastener. In some instances, deaccelerating quickly advantageously allows a power tool to shutoff more quickly. For example, grinders, circular saws, rotary tools, reciprocating saws, and string trimmers may benefit from a quicker shutoff in the event a user wants the power tool to stop. Quicker stopping of driving tools can also prevent over seating and/or overstressing accessories. However, quick deaccelerating of the power tool may cause accessory detachment, unintended engagement of a spindle lock, and other inertial effects. Because of these inertial effects, the power tool may throttle its deacceleration. In some instances, the deacceleration may involve activating a brake or other slowdown mechanism (e.g., change windings, employ regenerative braking, etc.), to allow a more rapid decent of the trigger. In some implementations, the target input can be negative.

As shown in FIG. 6, the graph 500 also demonstrates how in addition to making a tool feel more responsive, the dynamic trigger control also can reduce a total application time as a power tool gets to full speed faster. For power tool users that care about total cycle time, the dynamic trigger control can improve overall productivity.

Figure 7A:
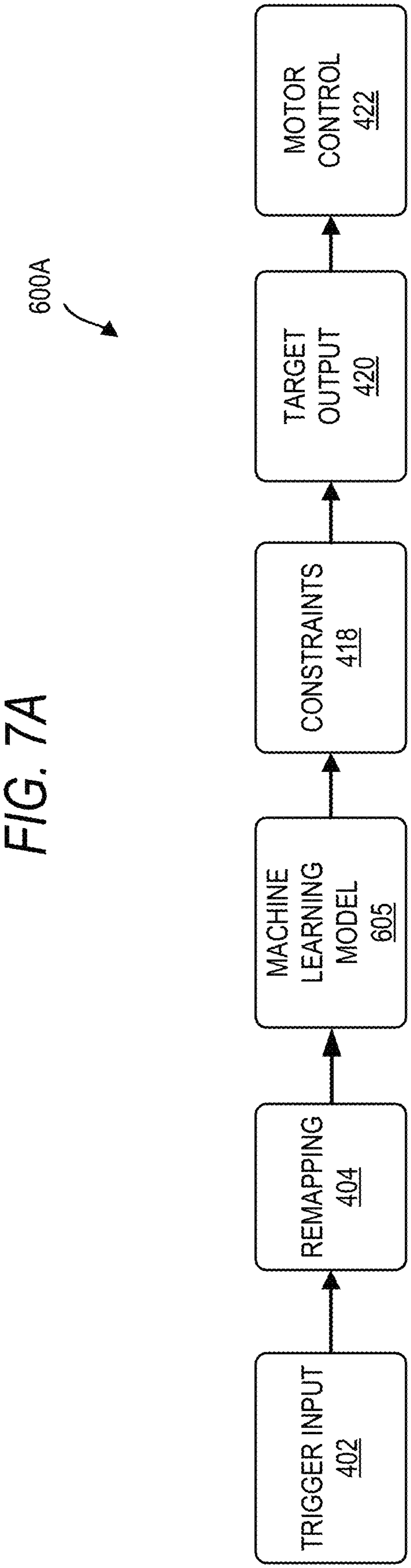
FIG. 7A illustrates a schematic control diagram of a power tool implemented with a machine learning model, according to some embodiments.

FIG. 7A illustrates a schematic control diagram 600A of the power tool 200 implemented with a machine learning model 605, according to one example embodiment. The schematic control diagram 600A includes the trigger input block 402, the remapping block 404, the constraints block 418, the target output block 420, the motor control block 422, and the machine learning model 605. The electronic processor 250 may utilize the machine learning model 605 to perform task associated with the dynamic trigger response 450 discussed above. In some embodiments, the machine learning model 605 is a trained machine learning model or program. For example, the machine learning model 605 may include any of the models the machine learning controller 240 is configured to construct as described in greater detail above with respect to FIGS. 1-3B. In some embodiments, the machine learning model 605 processes the output of the trigger input block 402 and/or the remapping block 404 and adjusts a trigger signal of the output received. Turning to FIG. 6, in some embodiments, the machine learning model 605 predicts the values of the second line plot. In some embodiments, the electronic processor 250 can use the output of the machine learning model 605 to control the motor 205. In some embodiments, the electronic processor 250 can use the output of the machine learning model 605 and the output of the constraints block 418 to generate an output that includes a target output value that is used to control the motor 205.

Figure 7B:
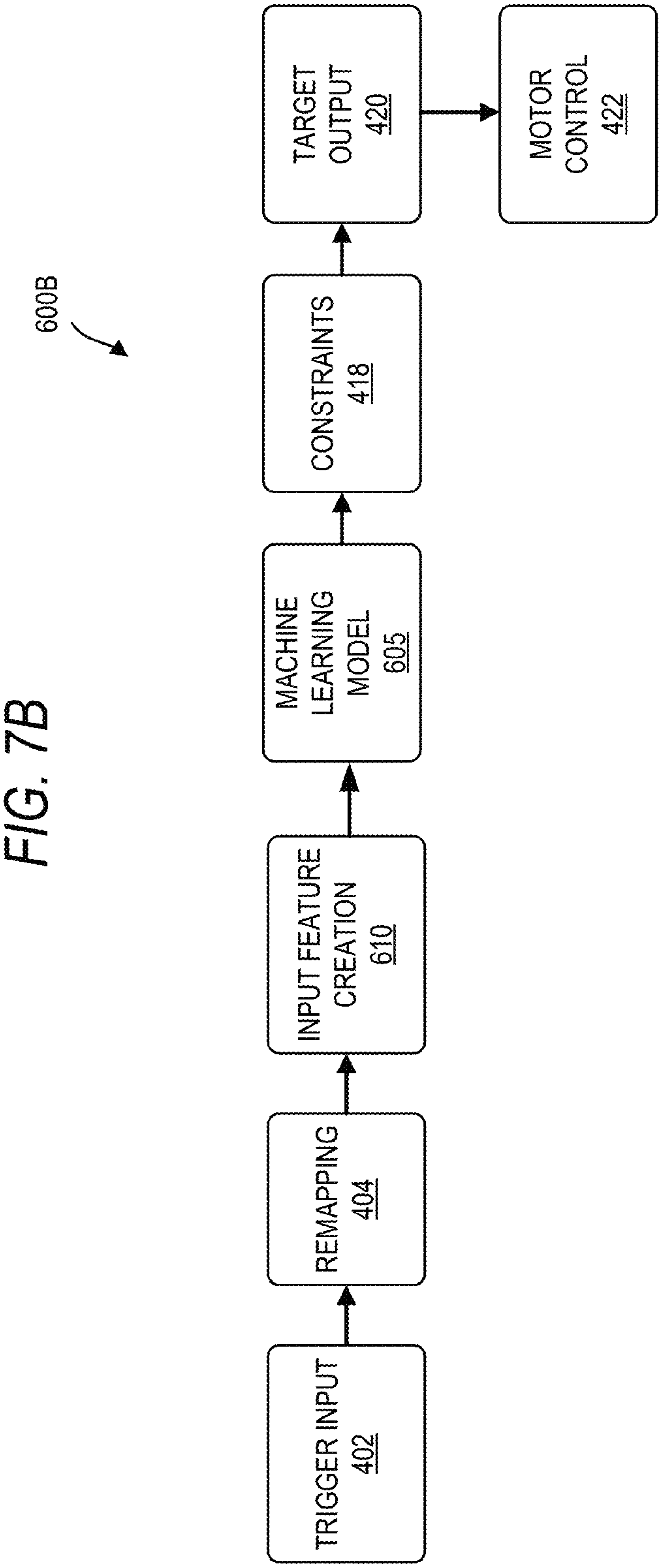
FIG. 7B illustrates a schematic control diagram of a power tool implemented with a machine learning model, according to some embodiments.

FIG. 7B illustrates a schematic control diagram 600B of the power tool 200 implemented with a machine learning model 605, according to some embodiments. The schematic control diagram 600B includes the trigger input block 402, the remapping block 404, the constraints block 418, the target output block 420, the motor control block 422, the machine learning model 605, and an input feature creation block 610. The input feature creation block 610 utilizes the existing data within the domain knowledge of the model to select and transform the most relevant variables of raw data into features for predictive models that better represent the underlying problem to produce new variables. After the machine learning model 605 receives the outputs of the input feature creation block 610, the electronic processor 250 may utilize the machine learning model 605 to perform tasks associated with the dynamic trigger response 450 described above. In some embodiments, the machine learning model 605 is a trained machine learning program. For example, the machine learning model 605 may include any of the models the machine learning controller 240 is configured to construct as described in greater detail above with respect to FIGS. 1-3B. In some embodiments, the machine learning model 605 processes the output of the trigger input block 402 and/or the remapping block 404 and adjusts a trigger signal of the output received. Turning to FIG. 6, in some embodiments, the machine learning model 605 predicts the values of the second line plot. In some embodiments, the electronic processor 250 can use the output of the machine learning model 605 to control the motor 205. In other embodiments, the electronic processor 250 can use the output of the machine learning model 605 and the output of the constraints block 418 to generate an output that includes a target output value that is used to control the motor 205.

Figure 7C:
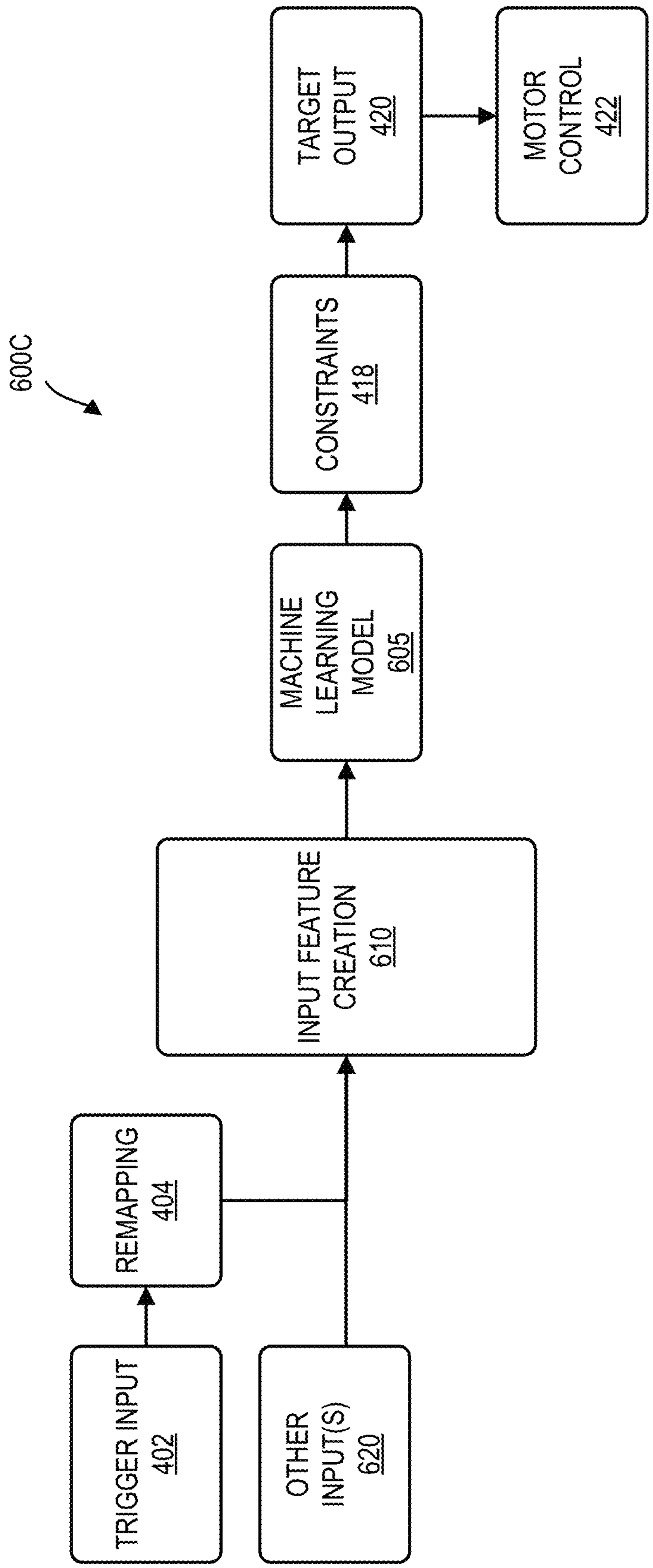
FIG. 7C illustrates a schematic control diagram of a power tool implemented with a machine learning model, according to some embodiments.

FIG. 7C illustrates a schematic control diagram 600C of the power tool 200 implemented with a machine learning model 605, according to some embodiments. The schematic control diagram 600C includes the trigger input block 402, the remapping block 404, the constraints block 418, the target output block 420, the motor control block 422, the machine learning model 605, the input feature creation block 610, and an other inputs block 620. The input feature creation block 610 utilizes the existing data within the domain knowledge of the model to select and transform the most relevant variables of raw data into features for predictive models that better represent the underlying problem to produce new variables. The other inputs block 620 provides other inputs of the power tool 200 other than the trigger signal. For example, the other inputs may include current load, motor speed, voltage load, motion, motor characteristics (e.g., phase advance), tool settings, grip detection, time information, bit information, orientation of the tool, fastener information, gearing implementation, and the like. The other inputs may be provided to the input feature creation block 610.

After the machine learning model 605 receives the outputs of the input feature creation block 610, the electronic processor 250 may utilize the machine learning model 605 to perform tasks associated with the dynamic trigger response 450 described above. In some embodiments, the machine learning model 605 is a trained machine learning program. For example, the machine learning model 605 may include any of the models the machine learning controller 240 is configured to construct as described in greater detail above with respect to FIGS. 1-3B. In some embodiments, the machine learning model 605 processes the output of the trigger input block 402 and/or the remapping block 404 and adjusts a trigger signal of the output received. Turning to FIG. 6, in some embodiments, the machine learning model 605 predicts the values of the second line plot. In some embodiments, the electronic processor 250 can use the output of the machine learning model 605 to control the motor 205. In other embodiments, the electronic processor 250 can use the output of the machine learning model 605 and the output of the constraints block 418 to generate an output that includes a target output value that is used to control the motor 205.

Figure 8:
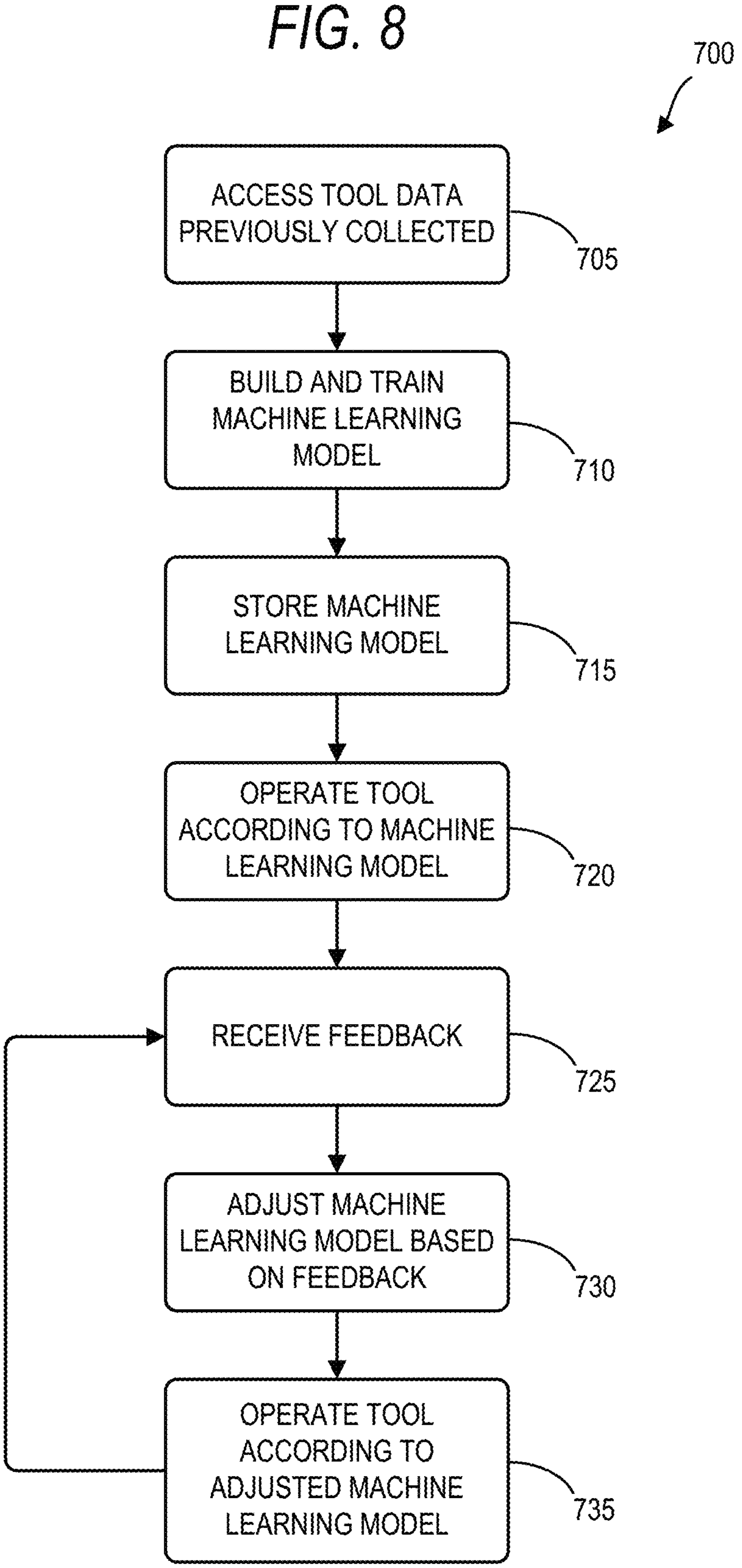
FIG. 8 illustrates a method of building and implementing a machine learning control, according to one embodiment.

FIG. 8 illustrates a method 700 of building and implementing the machine learning control 285. The method 700 is described with respect to power tool 200, but, as previously described with respect to FIGS. 3A-3B, the power tool 200 is representative of the power tool 102, 200 described in the respective systems of FIGS. 1-3A. In step 705, the electronic processor 250 accesses tool usage information previously collected from similar power tools. For example, to build the machine learning control 285 for the impact drivers of FIGS. 1-2, the electronic processor 250 accesses tool usage data previously collected from other impact drivers (e.g., via the network 114). The tool usage data includes, for example, trigger signals, motor current, motor voltage, motor position and/or velocity, usage time, battery state of charge, position of the power tool, position or velocity of the output shaft, number of impacts, and the like. The electronic processor 250 then proceeds to build and train the machine learning control 285 based on the tool usage data (step 710).

Building and training the machine learning control 285 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Training the machine learning control 285 includes providing training examples to the machine learning control 285 and using one or more algorithms to set the various weights, margins, or other parameters of the machine learning control 285 to make reliable estimations or classifications.

In some embodiments, building and training the machine learning control 285 includes building and training a recurrent neural network. Recurrent neural networks allow analysis of sequences of inputs instead of treating every input individually. That is, recurrent neural networks can base their determination or output for a given input not only on the information for that particular input, but also on the previous inputs. For example, when the machine learning control 285 is configured to predict a trigger signal value based on a trigger signal of the power tool 200. Accordingly, when implementing a recurrent neural network, the learning rate affects not only how each training example affects the overall recurrent neural network (e.g., adjusting weights, biases, and the like), but also affects how each input affects the output of the next input.

The electronic processor 250 builds and trains the machine learning control 285 to perform a particular task. For example, in some embodiments, the machine learning control 285 is trained to predict a trigger signal value based on a trigger signal of the power tool 200. In other embodiments, the machine learning control 285 is trained to detect a change in a trigger signal or when a detrimental condition is present or eminent (e.g., detecting kickback). The task for which the machine learning control 285 is trained may vary based on, for example, the type of power tool 200, a selection from a user, other power tool inputs, and the like. The electronic processor 250 uses different tool usage data to train the machine learning control 285 based on the particular task.

In some embodiments, the task for the machine learning controller 240 (e.g., for the machine learning control 285) also defines the particular architecture for the machine learning control 285. For example, for a first set of tasks, the electronic processor 250 may build a support vector machine, while, for a second set of tasks, the electronic processor 250 may build a neural network. In some embodiments, each task or type of task is associated with a particular architecture. In such embodiments, the electronic processor 250 determines the architecture for the machine learning control 285 based on the task and the machine learning architecture associated with the particular task.

After the electronic processor 250 builds and trains the machine learning control 285, the electronic processor 250 stores the machine learning control 285 in, for example, the memory 280 of the electronic control assembly 236 (step 715).

Once the machine learning control 285 is stored, the power tool 200 operates the motor 205 according to (or based on) the outputs and determinations from the machine learning controller 240 (step 720). In embodiments in which the machine learning controller 240 (including the machine learning control 285) is implemented in the server 112, the server 112 may determine operational thresholds from the outputs and determinations from the machine learning controller 240. The server 112 then transmits the determined operational thresholds to the power tool 200 to control the motor 205.

The performance of the machine learning controller 240 depends on the amount and quality of the data used to train the machine learning controller 240. Accordingly, if insufficient data is used to train the machine learning controller 240, the performance of the machine learning controller 240 may be reduced. Alternatively, different users may have different preferences and may operate the power tool 200 for different applications and in a slightly different manner (e.g., some users may press the power tool 200 against the work surface with a greater force, some may prefer a faster finishing speed, and the like). These differences in usage of the power tool 200 may also compromise some of the performance of the machine learning controller 240 from the perspective of a user.

Optionally, to improve the performance of the machine learning controller 240, in some embodiments, the electronic processor 250 receives feedback from the power tool 200 (or the external device 108) regarding the performance of the machine learning controller 240 (step 725). In other words, at least in some embodiments, the feedback is with regard to the adjusted trigger signal and control of the motor from the earlier step 720. In other embodiments, however, the power tool 200 does not receive user feedback regarding the performance of the machine learning controller 240 and instead continues to operate the power tool 200 by executing the machine learning control 285. As explained in further detail below, in some embodiments, the power tool 200 includes specific feedback mechanism for providing feedback on the performance of the machine learning controller 240. In some embodiments, the external device 108 may also provide a graphical user interface that receives feedback from a user regarding the operation of the machine learning controller 240. The external device 108 then transmits the feedback indications to the electronic processor 250. In some embodiments, the power tool 200 may only provide negative feedback to the electronic processor 250 (e.g., when the machine learning controller 240 performs poorly).

In some embodiments, the electronic processor 250 may consider the lack of feedback from the power tool 200 (or the external device 108) to be positive feedback indicating an adequate performance of the machine learning controller 240. In some embodiments, the power tool 200 receives, and provides to the electronic processor 250, both positive and negative feedback. In some embodiments, in addition to or instead of user feedback (e.g., directly input to the power tool 200), the power tool 200 senses one or more power tool characteristics via one or more sensors of the sensors 230, and the feedback is based on the sensed power tool characteristic(s). For example, on a torque wrench embodiment of the power tool 200, the torque wrench includes a torque sensor to sense output torque during a fastener operation, and the sensed output torque is provided as feedback. The feedback from the torque sensor can directly provide feedback to itself to prevent overshooting target torque during rundown and seating of a fastener. Alternatively, a sensor on a different power tool may be used (e.g., a separate powered torque wrench) to provide feedback.

The sensed output torque (e.g., feedback) may be evaluated locally on the power tool 200, or externally on the external device 108 or the server 112, to determine whether the feedback is positive or negative (e.g., the feedback may be positive when the sensed output (e.g., smoothness, motor efficiency, amount of advancement, etc.) is within an acceptable range, and negative when outside of the acceptable range). Alternatively, the sensed output may be used to scale or transfer outputs and/or adjusted thresholds and/or confidence ranges for the machine learning control 285. As described above, in some embodiments, the power tool 200 may send the feedback or other information directly to the server 112 while in other embodiments, an external device 108 may serve as a bridge for communications between the power tool 200 and the server 112 and may send the feedback to the server 112.

The electronic processor 250 then adjusts the machine learning control 285 based on the received feedback (step 730). In some embodiments, the electronic processor 250 adjusts the machine learning control 285 after receiving a predetermined number of feedback indications (e.g., after receiving 100 feedback indications). In other embodiments, the electronic processor 250 adjusts the machine learning control 285 after a predetermined period of time has elapsed (e.g., every two months). In yet other embodiments, the electronic processor 250 adjusts the machine learning control 285 continuously (e.g., after receiving each feedback indication). Adjusting the machine learning control 285 may include, for example, retraining the machine learning controller 240 using the additional feedback as a new set of training data or adjusting some of the parameters (e.g., weights, support vectors, and the like) of the machine learning controller 240. Because the machine learning controller 240 has already been trained for the particular task, re-training the machine learning controller 240 with the smaller set of newer data requires fewer computing resources (e.g., time, memory, computing power, etc.) than the original training of the machine learning controller 240.

In some embodiments, the machine learning control 285 includes a reinforcement learning control that allows the machine learning control 285 to continually integrate the feedback received by the power tool 200 or from the user via the external device 108 to optimize the performance of the machine learning control 285. In some embodiments, the reinforcement learning control periodically evaluates a reward function based on the performance of the machine learning control 285. In such embodiments, training the machine learning control 285 includes increasing the operation time of the power tool 200 such that the reinforcement learning control receives sufficient feedback to optimize the execution of the machine learning control 285. In some embodiments, when reinforcement learning is implemented by the machine learning control 285, a first stage of operation (e.g., training) is performed during manufacturing or before such that when a user operates the power tool 200, the machine learning control 285 can achieve a predetermined minimum performance (e.g., accuracy). The machine learning control 285, once the user operates his/her power tool 200, may continue learning and evaluating the reward function to further improve its performance. Accordingly, a power tool may be initially provided with a stable and predictable algorithm, which may be adapted over time. In some embodiments, reinforcement learning is limited to portions of the machine learning control 285. For example, in some embodiments, instead of potentially updating weights/biases of the entire or a substantial portion of the machine learning control 285, which can take significant processing power and memory, the actual model remains frozen or mostly frozen (e.g., all but last layer(s) or outputs), and only one or a few output parameters or output characteristics (such as final scaling parameters, filter parameters, weights, or thresholds) of the machine learning control 285 are updated based on feedback.

In some embodiments, the machine learning controller 240 interprets the operation of the power tool 200 by the user as feedback regarding the performance of the machine learning controller 240. For example, if the user presses the trigger harder during execution of a particular mode, the machine learning controller 240 may determine that the predicted trigger signal value selected by the machine learning controller 240 is not sufficiently high, and may increase the motor speed directly, use the received feedback to re-train or modify the machine learning controller 240, or a combination thereof. In some embodiments, the electronic processor 250 receives tool usage data from a variety of different power tools in, for example, step 725. Accordingly, when the electronic processor 250 adjusts the machine learning control 285 based on the user feedback (step 730), the electronic processor 250 may be adjusting the machine learning control 285 based on feedback from various users. In some embodiments, the power tool 200 may use only the feedback information from particular users to adjust the machine learning control 285. Using the feedback information from particular users may help customize the operation of the power tool 200 for the user of that particular tool.

After the electronic processor 250 adjusts the machine learning controller 240 based on the user feedback, the power tool 200 operates according to the outputs and determinations from the adjusted machine learning controller 240 (step 735). The adjusted machine learning controller 240 improves its performance by using a larger and more varied dataset (e.g., by receiving feedback indications from various users) for the training of the machine learning controller 240.

In some embodiments, the user may also select a learning rate for the machine learning controller 240. Adjusting the learning rate for the machine learning controller 240 impacts the speed of adjustment of the machine learning controller 240 based on the received user feedback. For example, when the learning rate is high, even a small number of feedback indications from the user (or users) will impact the performance of the machine learning controller 240. On the other hand, when the learning rate is lower, more feedback indications from the user are used to create the same change in performance of the machine learning controller 240. Using a learning rate that is too high may cause the machine learning controller 240 to change unnecessarily due to an anomalous operation of the power tool 200. On the other hand, using a learning rate that is too low may cause the machine learning controller 240 to remain unchanged until a large number of feedback indications are received requesting a similar change. In some embodiments, the power tool 200 includes a dedicated actuator to adjust the learning rate of the machine learning controller 240. In some embodiments, the activation switch 245 used to enable or disable the machine learning controller 240 may also be used to adjust the learning rate of the machine learning controller 240. For example, the activation switch 245 may include a rotary dial. When the rotary dial is positioned at a first end, the machine learning controller 240 may be disabled, as the rotary dial moves toward a second end opposite the first end, the machine learning controller 240 is enabled and the learning rate increases. When the rotary dial reaches the second end, the learning rate may be at a maximum learning rate. In other embodiments, an external device 108 (e.g., smartphone, tablet, laptop computer, an ASIC, and the like), may communicatively couple with the power tool 200 and provide a user interface to, for example, select the learning rate. In some embodiments, the selection of a learning rate may include a selection of a low, medium, or high learning rate. In other embodiments, more or fewer options are available to set the learning rate and may include the ability to turn off learning (i.e., setting the learning rate to zero).

As described above, when the machine learning controller 240 implements a recurrent neural network, the learning rate (or sometimes referred to as a "switching rate") affects how previous inputs or training examples affect the output of the current input or training example. For example, when the switching rate is high, the previous inputs have minimal effect on the output associated with the current input. That is, when the switching rate is high, each input is treated more as an independent input. On the other hand, when the switching rate is low, previous inputs have a high correlation with the output of the current input. That is, the output of the current input is highly dependent on the outputs determined for previous inputs. In some embodiments, the user may select the switching rate in correlation (e.g., with the same actuator) with the learning rate. In other embodiments, however, a separate actuator (or graphical user interface element) is generated to alter the switching rate independently from the learning rate. The methods or components to set the switching rate are similar to those described above with respect to setting the learning rate.

The description of FIG. 8 focuses on the electronic processor 250 training, storing, and adjusting the machine learning control 285. In some embodiments, however, the server 112 and/or the external device 108 may perform some or all of the steps described above with respect to FIG. 8. With reference to FIG. 5, the dynamic trigger response 450 includes the kick parameters block 412. In some embodiments, an adaptive algorithm (e.g., the machine learning control 285 or control theory-based implementation) can adjust the kick parameters block 412 based on feedback received from a user. Useful forms of feedback for dynamic trigger control to an adjustable algorithm may include, for example, metrics of overshoot/undershoot, accuracy of predicting a trigger in the future (e.g., 50 ms in the future), overall stability, metric of motor efficiency, rise time, fall time, occurrence of second trigger pulls indicating unseated fasteners, reverse trigger pulls indicating over-seating, etc. This feedback can be utilized in a variety of ways. For example, when the dynamic trigger output drastically exceeds (e.g., overshoot or undershoot) the final output of the user after 100 ms, then the electronic processor 250 adjusts (e.g., increments or decrements) the kick parameters block 412 of FIG. 5. Additional techniques for utilizing the feedback are provided in U.S. Pat. No. 11,221,611, the entire content of which is hereby incorporated by reference.

Figure 9:
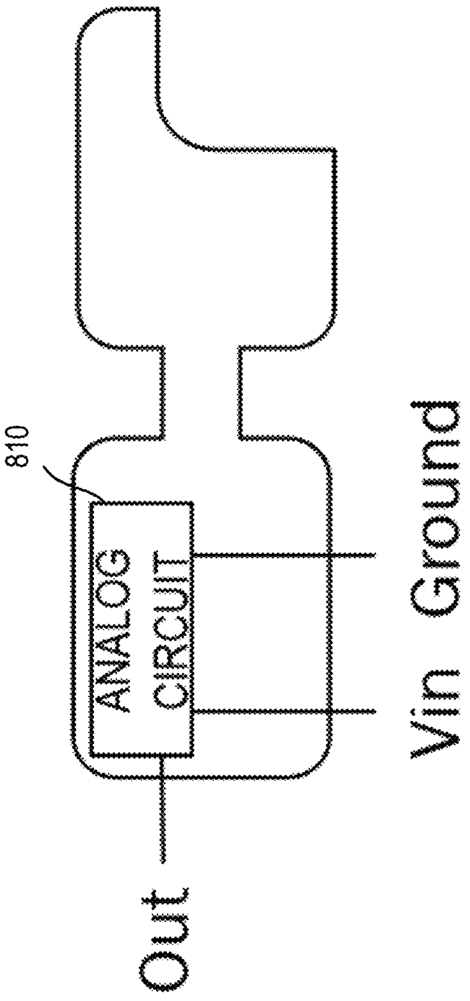
FIG. 9 illustrates a circuit of a power tool for controlling a dynamic trigger response, according to some embodiments.

FIG. 9 illustrates a circuit 810 (e.g., an analog circuit) of the power tool 200 for controlling a dynamic trigger response, according to some embodiments. The circuit 810 may include hardware components such as, for example, capacitors, amplifiers, etc. In some embodiments, the circuit 810 is configured to receive a trigger signal from a sensor of the trigger assembly 120 as described above with respect to FIG. 2. The circuit 810 is configured to perform functions in substantially the same manner as the dynamic trigger response 450 of FIG. 5 described above. In some embodiments, the circuit 810 is configured to receive a raw trigger position signal and generate a signal associated with a dynamic change of the trigger position. However, the circuit 810 is implemented only using hardware components to provide the various filtering and limiting operations of the dynamic trigger response 450 (e.g., thereby reducing computational complexity for the power tool 200). In some embodiments, some of the components of the circuit 810 may be positioned within the trigger assembly 120 itself or on a main printed circuit board within the housing of the power tool 102. In other embodiments, the circuit 810 may be implemented using hardware and software and distributed across multiple locations of the power tool 102. For example, the circuit 810 includes a microcontroller configured to process trigger signals separate from the power tool 200. In another example, the circuit 810 includes digital logic (e.g., a FPGA) that performs dynamic trigger control. In some implementations, the trigger 210 is configured to mechanically embody a dynamic trigger control (e.g., a spring acting on a pressure sensor that is combined with a leaky gas chamber for a rate of change effect).

Figure 10:
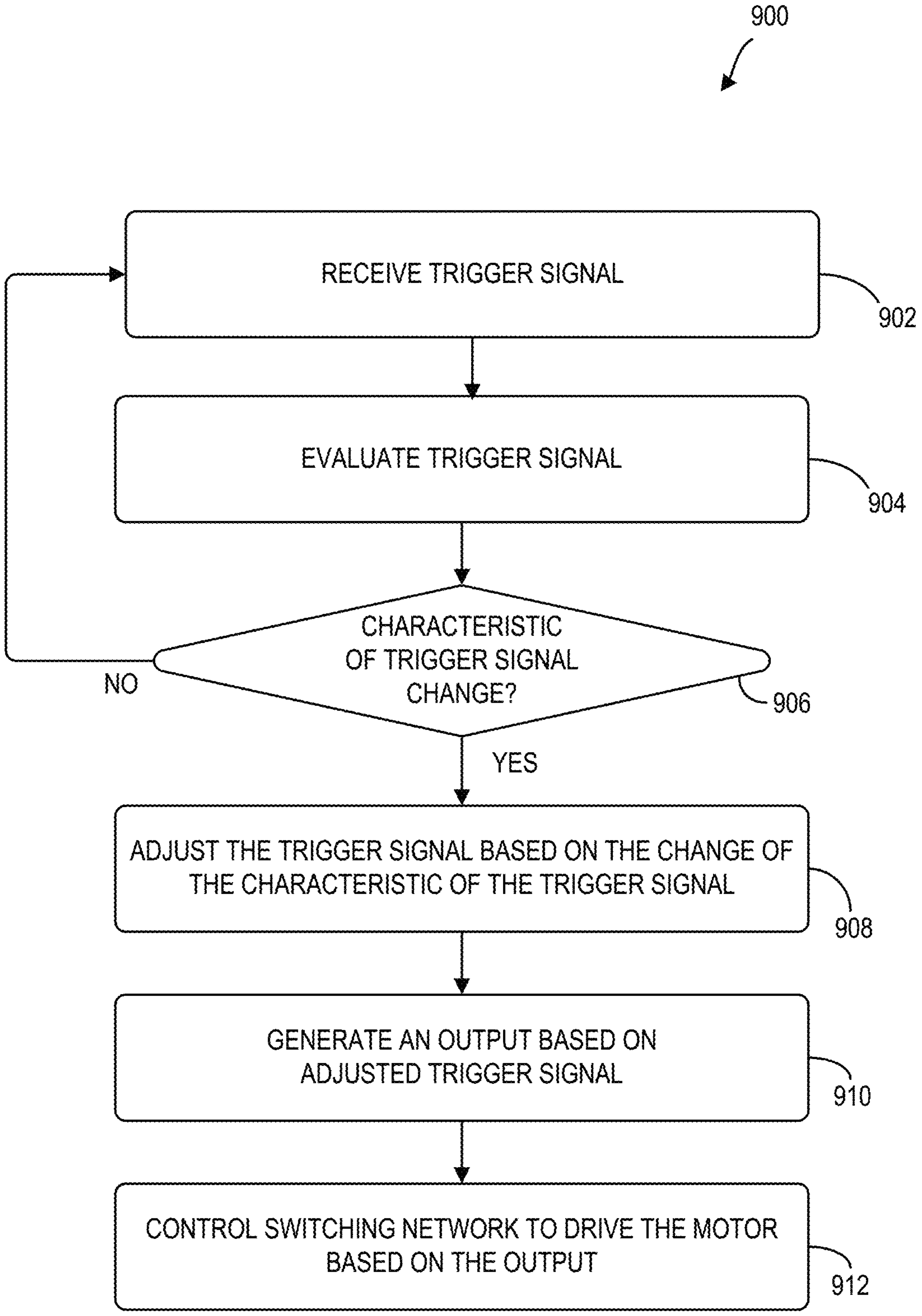
FIG. 10 is a flowchart illustrating a method of implementing a dynamic trigger response to control a power tool, according to some embodiments.

FIG. 10 is a flowchart illustrating a method 900 of implementing dynamic trigger mapping to control the power tool 200. In step 902, the power tool 200 receives a trigger signal corresponding to a first amount of activation of the trigger 210 indicating that the power tool 200 is to begin or continue an operation. During operation of the power tool 200, the electronic processor 250 or the circuit 810 receives the trigger signal and evaluates a characteristic (e.g., rate of change) of the trigger signal at step 904. In some embodiments, the electronic processor 250 processes the trigger signal with the dynamic trigger response 450. In other embodiments, the electronic processor 250 processes the trigger signal with the machine learning controller 240. In yet other embodiments, the circuit 810 processes the trigger signal of the power tool 200. In some embodiments, at step 904, evaluating a characteristic of the trigger signal includes determining a magnitude of the characteristic associated with the first amount of activation of the trigger 210.

In step 906, the electronic processor 250 determines whether the characteristic of the trigger signal changes. For example, the electronic processor 250 determines whether the rate of change of the trigger signal exceeds a predetermined threshold over a defined time period. In some embodiments, when the electronic processor 250 determines that the characteristic of the trigger signal does not change (e.g., exceed the predetermined threshold), the electronic processor 250 or circuit 810 returns to step 902 and continues to receive trigger signals from the trigger assembly 120. In other embodiments, when the electronic processor 250 determines that the characteristic of the trigger signal does change (e.g., exceed the predetermined threshold), the electronic processor 250 determines that a variance is present in the trigger signal. In some embodiments, in step 906, the electronic processor 250 determines a change in the magnitude of the characteristic.

In step 908, the electronic processor 250 adjusts the trigger signal that is received based on the change that is detected in step 906. For example, the electronic processor 250 determines a scaling factor and multiplies the scaling factor with the detected change of the characteristic or the determined change in the magnitude of the characteristic. The electronic processor 250 may combine the product of the scaling factor and the detected change of the characteristic with the trigger signal. In some embodiments, the machine learning controller 240 generates an output (e.g., a predicted value of the trigger signal) based on the trigger signal. The machine learning controller 240 may also generate the output using additional inputs of the power tool 200, as described above. In other embodiments, the circuit 810 can, for example, amplify the trigger signal based on the detected change of the characteristic.

In step 910, the electronic processor 250 generates a target output based on the adjusted trigger signal. For example, the electronic processor 250 modifies the trigger signal so that the trigger signal corresponds to a second amount (e.g., target output) of trigger activation that is different from the first amount trigger activation based on the detected change in the trigger signal (for example, based on the change in the magnitude of the characteristic). In some embodiments, the electronic processor 250 modifies the trigger signal so that the trigger signal corresponds to the second amount of activation based on output (e.g., a predicted value) of the machine learning controller 240. In other embodiments, the circuit 810 modifies the trigger signal to the second amount of activation using only hardware circuitry.

In step 912, the electronic processor 250 controls operation of the motor 205 based on the output generated in step 910. For example, the electronic processor 250 controls the switching network 217 to drive the motor 205 to reach the target output (e.g., a particular motor speed) corresponding to the modified trigger signal. In some embodiments, the electronic processor 250 uses the output of the machine learning controller 240 to control the switching network 217 to drive the motor 205 to reach the target output (e.g., a particular motor speed) corresponding to the modified trigger signal. In other embodiments, the circuit 810 controls the switching network 217 to drive the motor 205 to reach the target output (e.g., a particular motor speed) corresponding to the modified trigger signal.

In some embodiments, an automatic adjustment of the dynamic trigger response can be implemented (e.g., by the electronic processor 250). For example, the dynamic trigger response can be automatically tuned by adjusting parameters (e.g., filter parameters, scaling parameters, weights, etc.) to reward and/or penalize the dynamic trigger response. The rewards or penalties can be based on, among other things, overshoot (e.g., trigger overshoot), undershoot (e.g., trigger undershoot), smoothness (e.g. smoothness of the target output or smoothness of the modified signal), motor efficiency, an amount of advancement, etc. In some embodiments, the machine learning controller 240 uses reinforcement learning to automatically adjust the dynamic trigger response based on the noted parameters or characteristics for awards and penalties.

While the embodiments described herein disclose processing of the dynamic trigger on the power tool, the processing described herein can performed on another power tool device, such as a battery pack, an electrically powered side handle with a trigger, in a power tool battery pack adapter, etc. Additionally, the disclosed processing of the dynamic trigger on the power tool to generate dynamic effects for trigger control, other trigger control innovations, such as debounce, hysteresis, custom mappings, etc., can be utilized in parallel with the disclosed embodiments.

Thus, embodiments described herein provide, among other things, dynamic trigger response implementations for operation of a power tool. Various features and advantages are set forth in the following claims.

What is claimed is:

1. A power tool comprising:

a housing;

a motor located within the housing and coupled to an output member;

a motor drive circuit configured to drive the motor;

a trigger configured to generate a trigger signal related to an activation of the trigger; and an electronic controller connected to the motor drive circuit, the electronic controller configured to:

receive the trigger signal from the trigger, the trigger signal corresponding to a first amount of activation of the trigger, determine a rate of change associated with the first amount of activation of the trigger, modify the trigger signal based on the rate of change, the modified trigger signal corresponding to a second amount of activation of the trigger, the second amount of activation of the trigger being different than the first amount of activation of the trigger, and control the motor drive circuit to drive the motor based on the modified trigger signal.

2. The power tool of claim 1, further comprising a communication interface connected to the electronic controller, the communication interface configured to communicate with an external device, wherein, to modify the trigger signal based on the rate of change, the electronic controller is further configured to:

receive, via the communication interface, a configuration setting of the power tool, a value for the configuration setting being selected via a user input on the external device, and modify a parameter that is used to modify the trigger signal to generate the modified trigger signal based on the configuration setting.

3. The power tool of claim 1, wherein, to modify the trigger signal based on the rate of change, the electronic controller is further configured to apply one or more constraints to the modified trigger signal to limit an amount of modification to the trigger signal.

4. The power tool of claim 1, further comprising a sensor of the trigger coupled to the electronic controller, the sensor configured to provide the trigger signal to the electronic controller, wherein the trigger signal indicates a position of the trigger.

5. The power tool of claim 1, wherein the electronic controller is further configured to:

receive feedback information related to the modified trigger signal, the feedback information being selected from a group consisting of: overshoot, undershoot, smoothness of the modified trigger signal, and motor efficiency, and modify, based on the received feedback information, a parameter that is used to modify the trigger signal to generate the modified trigger signal.

6. The power tool of claim 1, wherein the electronic controller includes memory that includes a trained machine learning model, wherein the electronic controller is further configured to:

process, with the trained machine learning model, the trigger signal from the trigger, and generate a target output that includes the modified trigger signal.

7. The power tool of claim 2, wherein the parameter is a kick parameter or a filter parameter.

8. The power tool of claim 6, further comprising a communication interface connected to the electronic controller, the communication interface configured to communicate with an external device, wherein the electronic controller is further configured to:

receive feedback regarding a performance of the trained machine learning model from at least one selected from a group consisting of: users via the communication interface, one or more sensors included in the power tool, or both, and re-train the trained machine learning model based on the feedback.

9. A method for implementing a dynamic trigger response to control a power tool, the method comprising:

receiving a trigger signal from a trigger of the power tool, the trigger signal corresponding to a first amount of activation of the trigger;

determining a rate of change associated with the first amount of activation of the trigger;

modifying the trigger signal based on the rate of change, the modified trigger signal corresponding to a second amount of activation of the trigger, the second amount of activation of the trigger being different than the first amount of activation of the trigger; and driving a motor of the power tool based on the modified trigger signal.

10. The method of claim 9, wherein modifying the trigger signal based on the rate of change includes:

receiving a selection of a value for a configuration setting of the power tool; and modifying a parameter that is used to modify the trigger signal to generate the modified trigger signal based on the configuration setting.

11. The method of claim 9, wherein modifying the trigger signal based on the rate of change includes:

applying one or more constraints to the modified trigger signal to limit an amount of modification to the trigger signal.

12. The method of claim 9, further comprising:

generating, by a sensor of the trigger, the trigger signal, wherein the trigger signal indicates a position of the trigger.

13. The method of claim 9, further comprising:

receiving feedback information related to the modified trigger signal, the feedback information being selected from a group consisting of: overshoot, undershoot, signal smoothness, and motor efficiency; and modifying, based on the feedback information, a parameter that is used to modify the trigger signal to generate the modified trigger signal.

14. The method of claim 9, further comprising:

processing, with a trained machine learning model, the trigger signal from the trigger; and generating a target output that includes the modified trigger signal.

15. The method of claim 10, wherein the parameter is at least one selected from a group consisting of a kick parameter and a filter parameter.

16. The method of claim 14, further comprising:

receiving feedback regarding a performance of the trained machine learning model from one or more users of the power tool, one or more sensors included in the power tool, or both; and re-training the trained machine learning model based on the feedback.

17. A power tool comprising:

a housing;

a motor located within the housing and coupled to an output member;

a motor drive circuit configured to drive the motor;

a trigger configured to generate a trigger signal related to an activation of the trigger; and an electronic controller coupled to the motor drive circuit, the electronic controller configured to:

receive the trigger signal from the trigger, the trigger signal corresponding to a first amount of activation of the trigger, determine a rate of change associated with the first amount of activation of the trigger, detect a change in the rate of change associated with the first amount of activation of the trigger, modify the trigger signal based on the detected change in the rate of change, the modified trigger signal corresponding to a second amount of activation of the trigger, the second amount of activation of the trigger being different than the first amount of activation of the trigger, control the motor drive circuit to drive the motor based on the modified trigger signal, receive feedback information related to the modified trigger signal, and modify a parameter that is used to adjust the modified trigger signal based on the received feedback information.

18. The power tool of claim 17, wherein the feedback information is selected from a group consisting of: an overshoot value, an undershoot value, a smoothness value, motor efficiency, and an amount of advancement.

* * * * *